US012676276B2

(12) United States Patent
Choi et al.

(10) Patent No.: US 12,676,276 B2
(45) Date of Patent: Jul. 7, 2026

(54) EMITTER AND FIELD EMISSION ASSEMBLY INCLUDING THE SAME

(71) Applicant: AweXome Ray, Inc., Anyang-si (KR)

(72) Inventors: Hong Soo Choi, Seoul (KR); Keun Soo Jeong, Seoul (KR); Hyeon Gu Cho, Yongin-si (KR); Young Bae Kim, Anyang-si (KR); So Ra Lee, Hanam-si (KR); Se Hoon Gihm, Seongnam-si (KR)

(73) Assignee: AWEXOME RAY, INC., Anyang-si (KR)

( * ) Notice: Subject to any disclaimer, the term of this patent is extended or adjusted under 35 U.S.C. 154(b) by 253 days.

(21) Appl. No.: 18/559,760

(22) PCT Filed: Sep. 20, 2023

(86) PCT No.: PCT/KR2023/014299
§ 371 (c)(1),
(2) Date: Dec. 29, 2023

(87) PCT Pub. No.: WO2025/063335
PCT Pub. Date: Mar. 27, 2025

(65) Prior Publication Data
US 2025/0226170 A1 Jul. 10, 2025

(51) Int. Cl.
*H01J 35/06* (2006.01)
*H01J 1/304* (2006.01)

(52) U.S. Cl.
CPC ............ *H01J 35/065* (2013.01); *H01J 1/304* (2013.01); *H01J 2201/30434* (2013.01); *H01J 2201/30469* (2013.01); *H01J 2235/062* (2013.01)

(58) Field of Classification Search
None
See application file for complete search history.

(56) References Cited

U.S. PATENT DOCUMENTS

| | | | | |
|---|---|---|---|---|
| 7,868,531 | B2 * | 1/2011 | Liang | H01J 31/127 257/E51.04 |
| 8,193,692 | B2 * | 6/2012 | Lee | H01J 1/304 313/351 |
| 9,196,450 | B2 * | 11/2015 | Liu | H01J 35/065 |
| 10,196,271 | B2 * | 2/2019 | Zhang | C01B 32/164 |
| 11,600,462 | B2 * | 3/2023 | Gihm | H01J 1/3042 |
| 11,798,773 | B2 * | 10/2023 | Gihm | H01J 1/304 |
| 11,913,146 | B1 * | 2/2024 | Fairchild | D03D 1/00 |

(Continued)

FOREIGN PATENT DOCUMENTS

| | | | |
|---|---|---|---|
| JP | 2008523254 | A | 7/2008 |
| KR | 101384100 | B1 | 4/2014 |

(Continued)

OTHER PUBLICATIONS

Machine translation of KR 10-2016-0102748 A (Year: 2016).*

*Primary Examiner* — Thomas R Artman
(74) *Attorney, Agent, or Firm* — SEED INTELLECTUAL PROPERTY LAW GROUP LLP

(57) ABSTRACT

Provided is an emitter. The emitter according to an aspect of the present disclosure is formed in a form of a sheet including carbon nanotube, and the emitter includes at least one of a part curved to form a ridge in a direction of electron emission and a part bent to form a ridge in the direction of electron emission.

18 Claims, 20 Drawing Sheets

(56) References Cited

U.S. PATENT DOCUMENTS

| | | | | |
|---|---|---|---|---|
| 12,412,724 | B2 * | 9/2025 | Choi | H01J 9/025 |
| 2007/0261140 | A1 * | 11/2007 | Liang | H01J 9/025 250/306 |
| 2008/0170982 | A1 * | 7/2008 | Zhang | C04B 35/62897 423/447.3 |
| 2010/0181896 | A1 * | 7/2010 | Lee | D06M 10/005 313/496 |
| 2014/0185777 | A1 * | 7/2014 | Liu | H01J 35/065 378/122 |
| 2019/0002283 | A1 | 1/2019 | Zhang et al. | |
| 2020/0243295 | A1 * | 7/2020 | Gihm | H01J 35/065 |
| 2022/0392730 | A1 * | 12/2022 | Gihm | H01J 35/065 |
| 2024/0136138 | A1 * | 4/2024 | Choi | H01J 35/065 |
| 2024/0136142 | A1 * | 4/2024 | Choi | H01J 35/08 |
| 2024/0234071 | A9 * | 7/2024 | Choi | C01B 32/16 |
| 2024/0234074 | A9 * | 7/2024 | Choi | H01J 1/304 |
| 2025/0226170 | A1 * | 7/2025 | Choi | H01J 1/304 |

FOREIGN PATENT DOCUMENTS

| | | | |
|---|---|---|---|
| KR | 20160102748 | A | 8/2016 |
| KR | 20210081951 | A | 7/2021 |
| KR | 20220096628 | A | 7/2022 |

* cited by examiner

[FIG. 1]
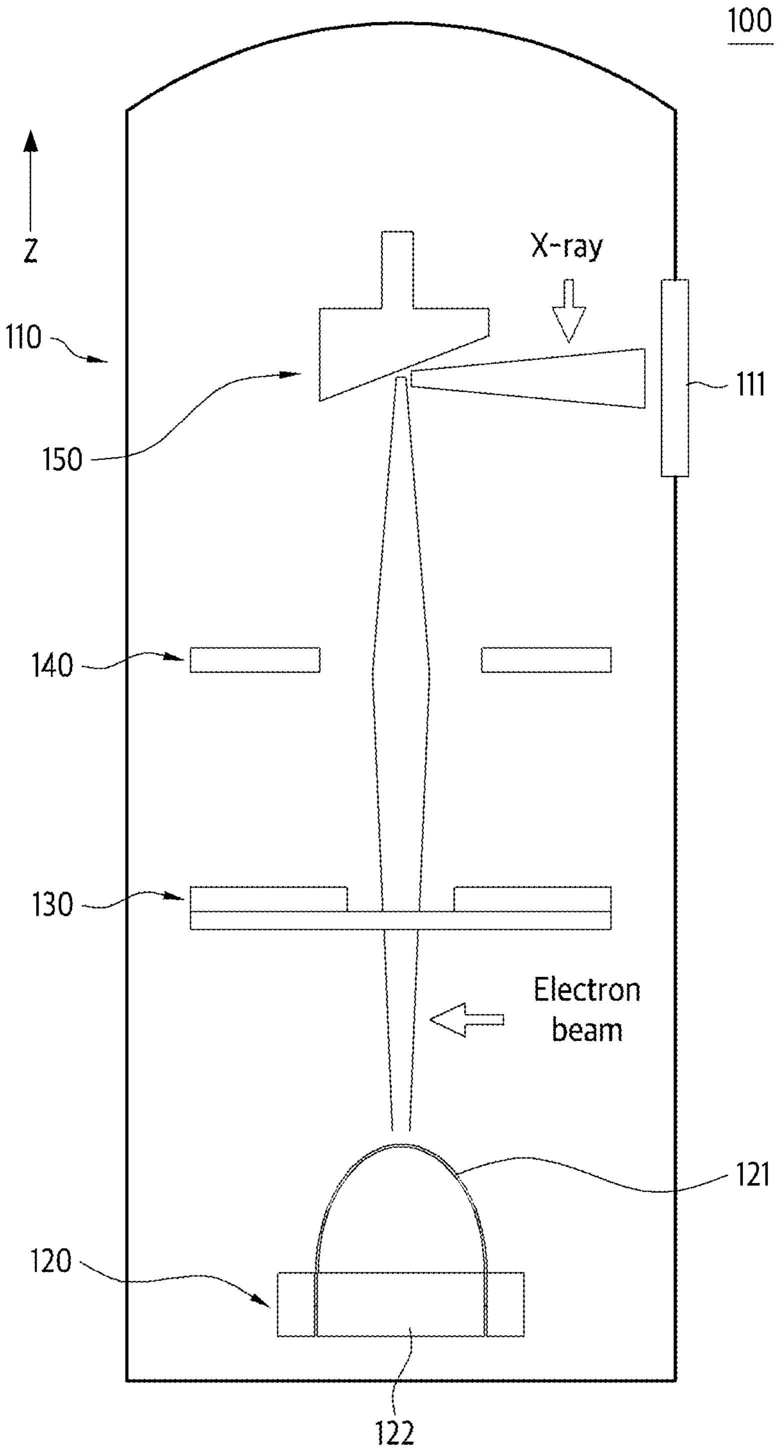

[FIG. 2]
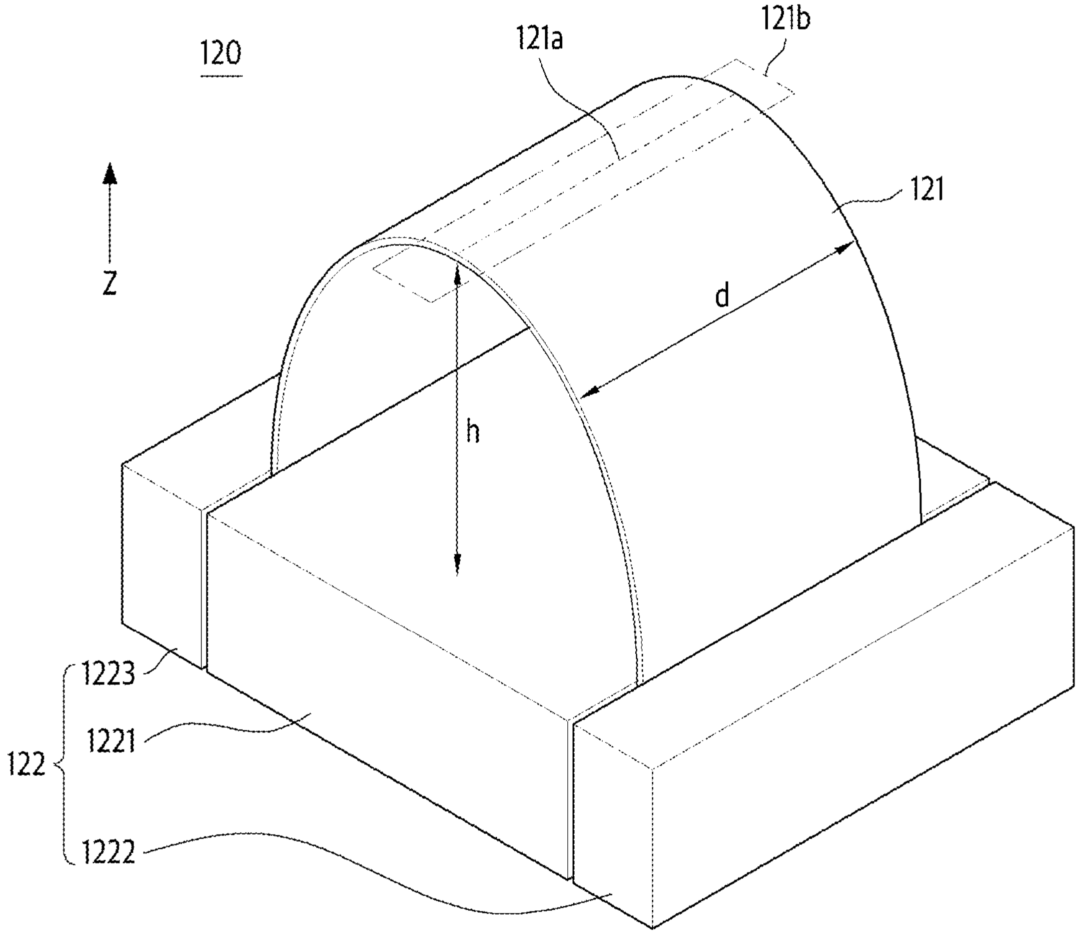

[FIG. 3]
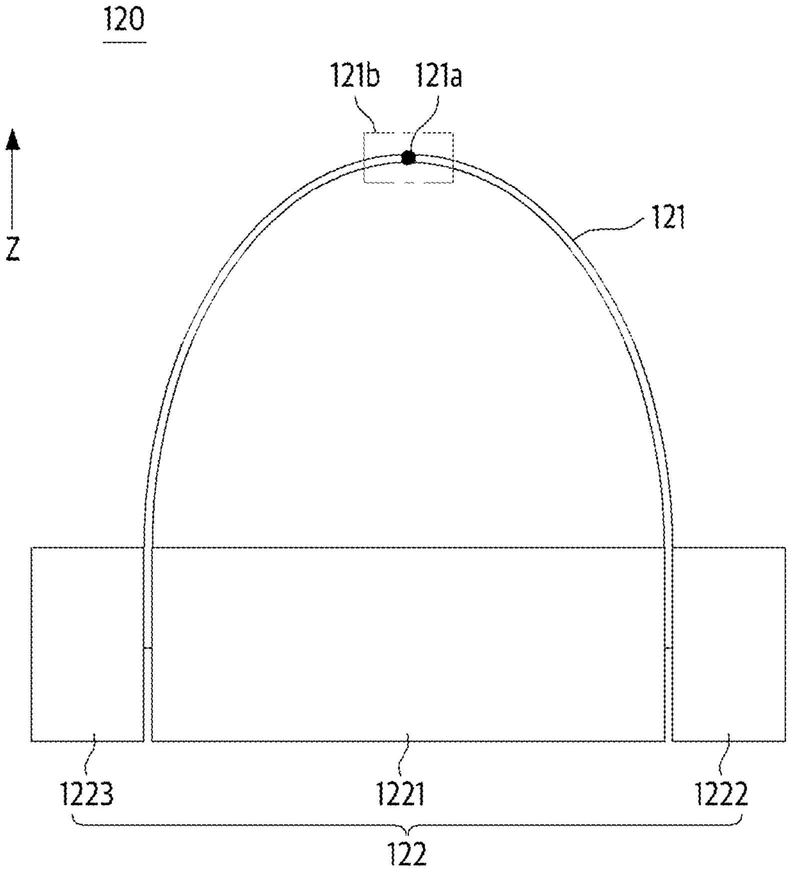

[FIG. 4]
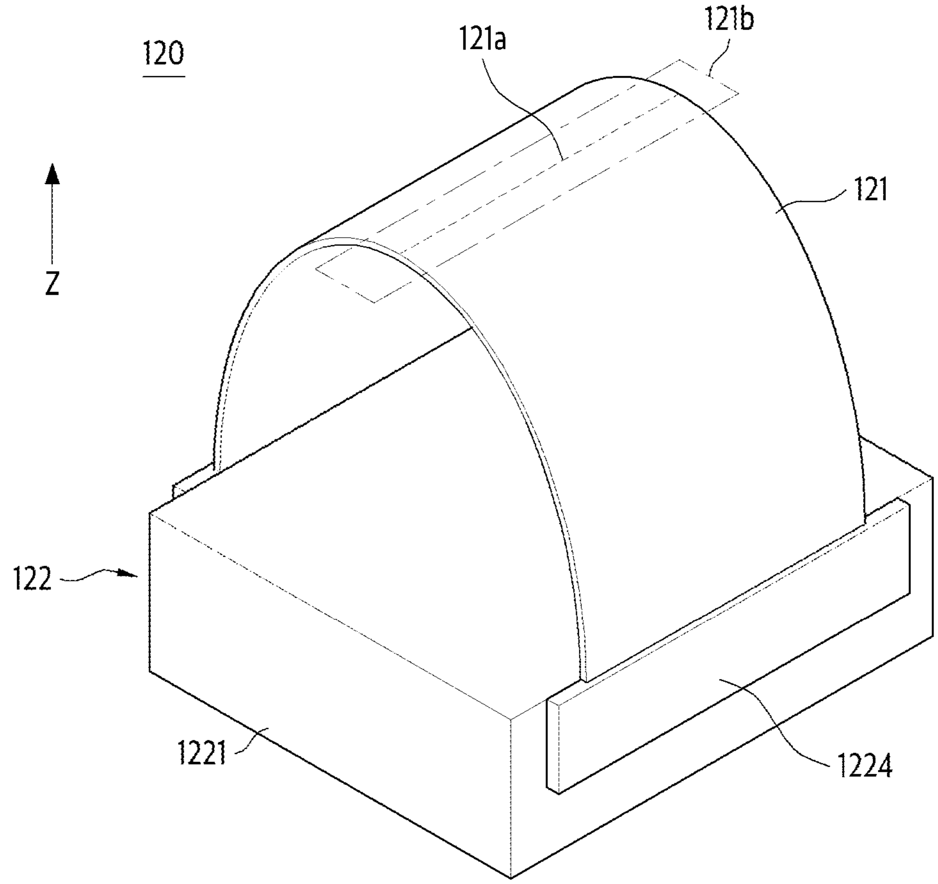

[FIG. 5]
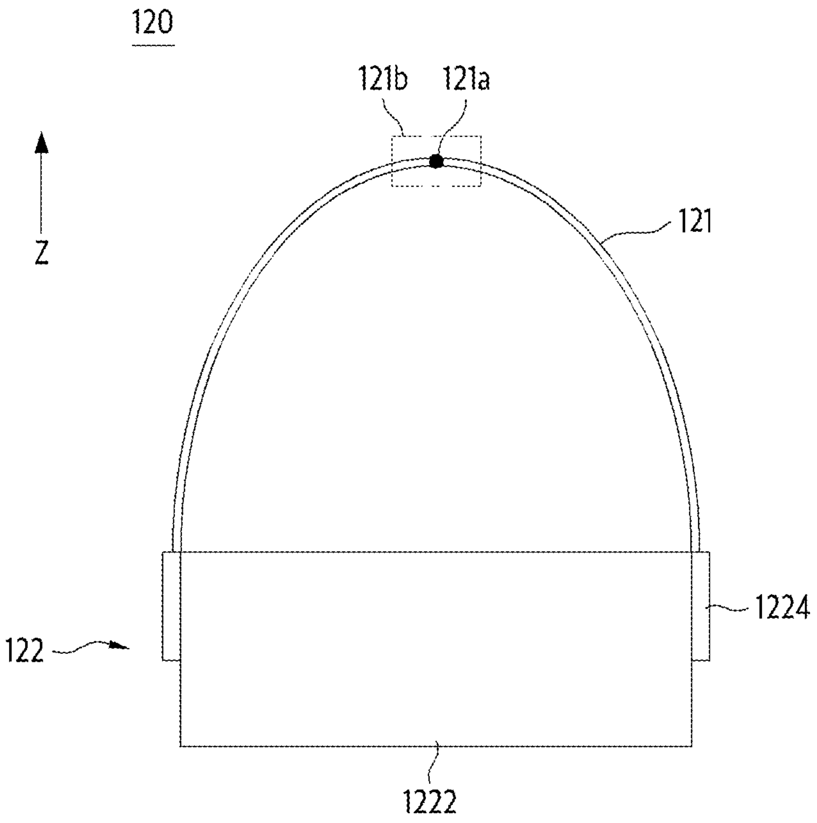

[FIG. 6]
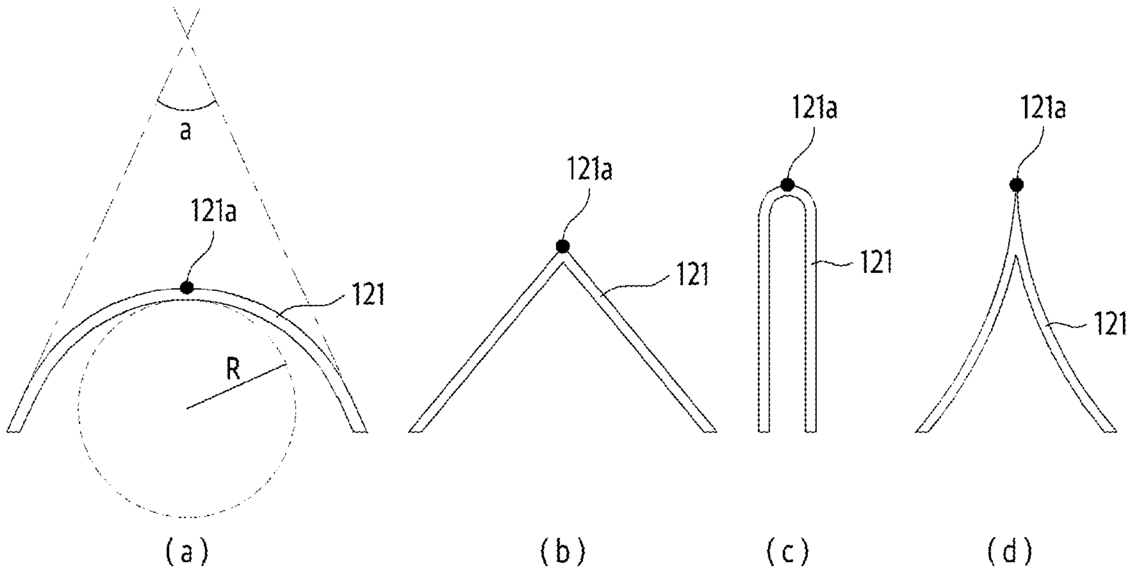

[FIG. 7]
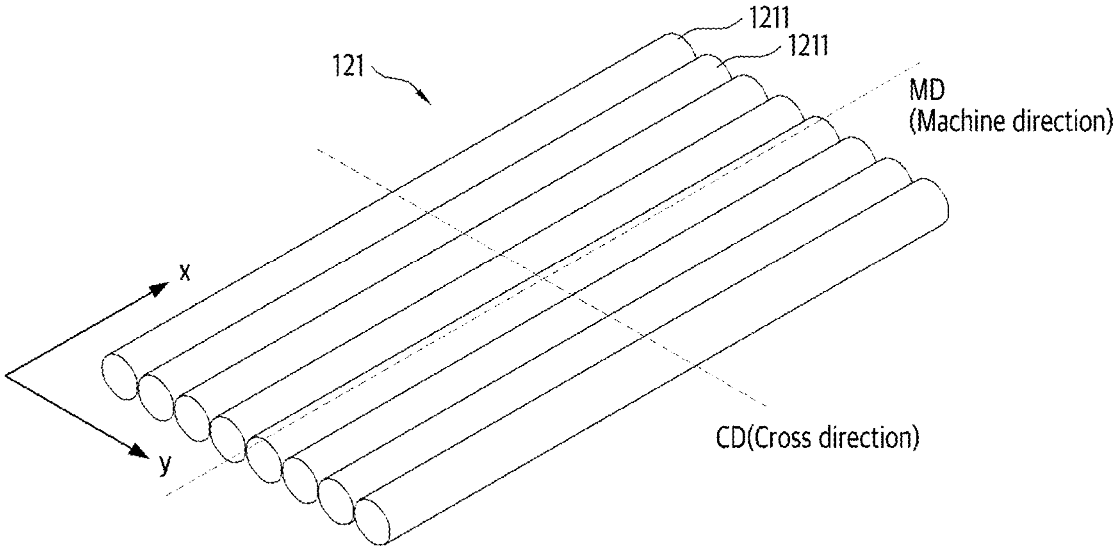

[FIG. 8]
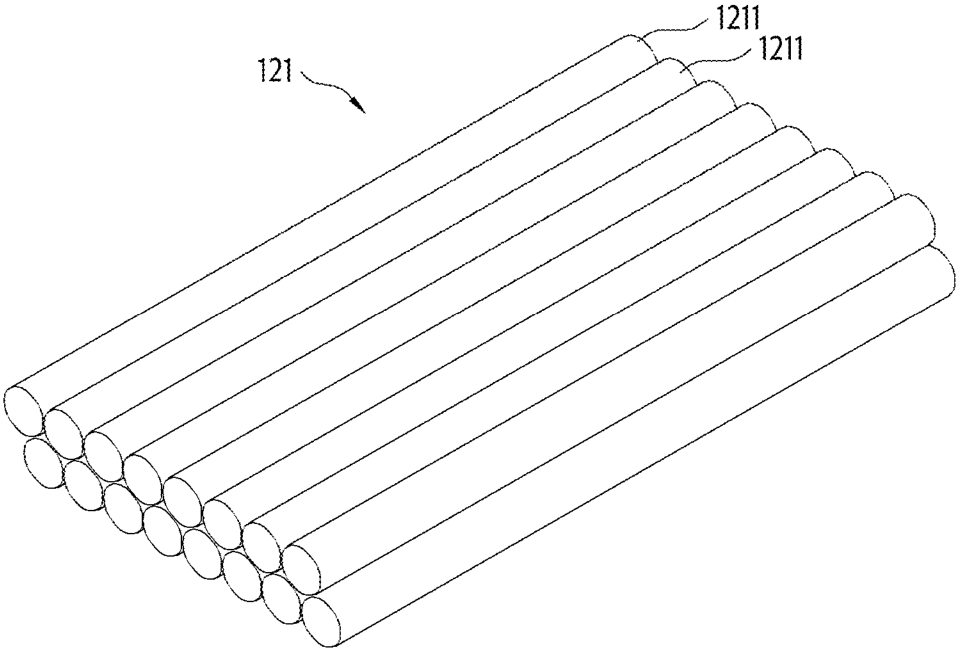

[FIG. 9]
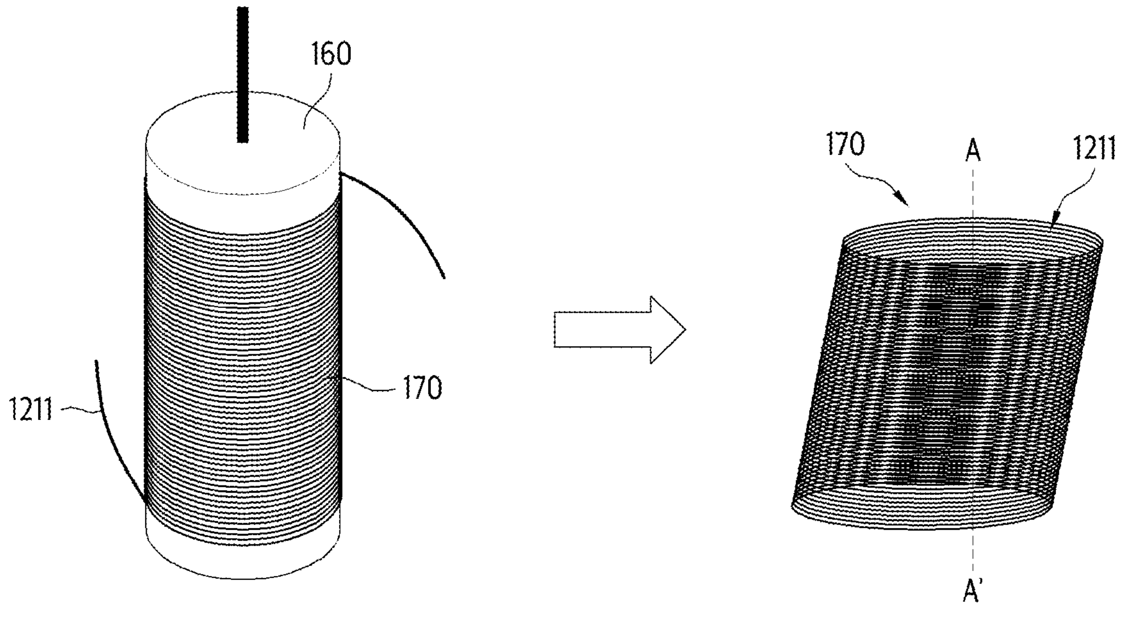

[FIG. 10]
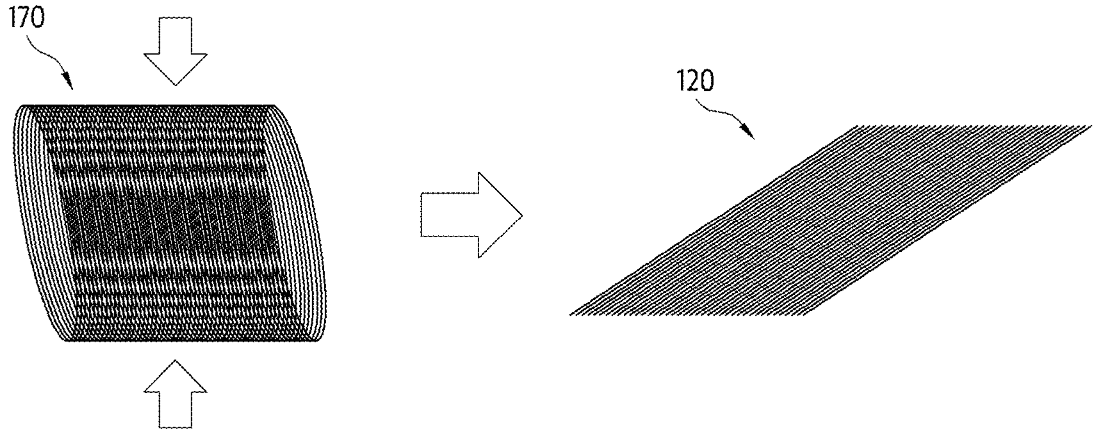

[FIG. 11]
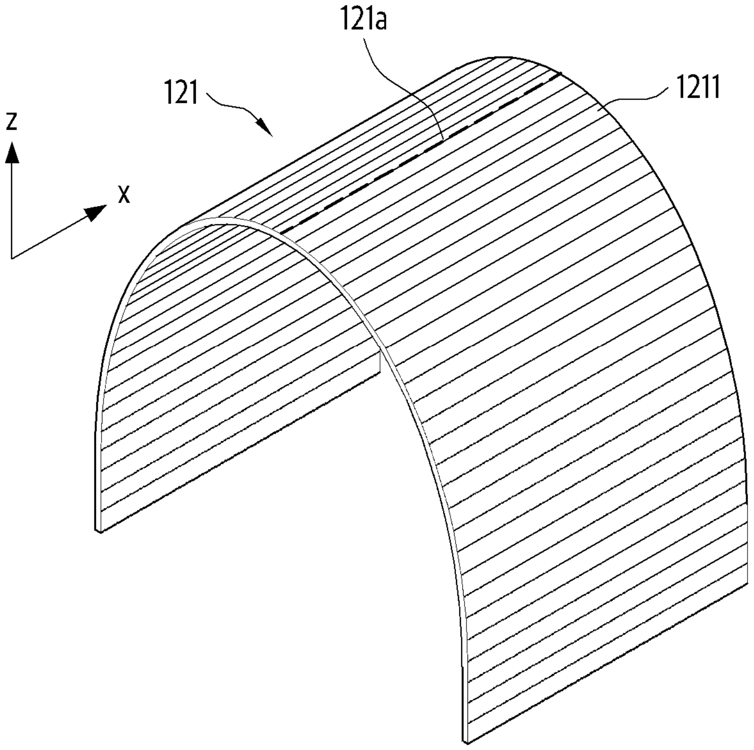

[FIG. 12]
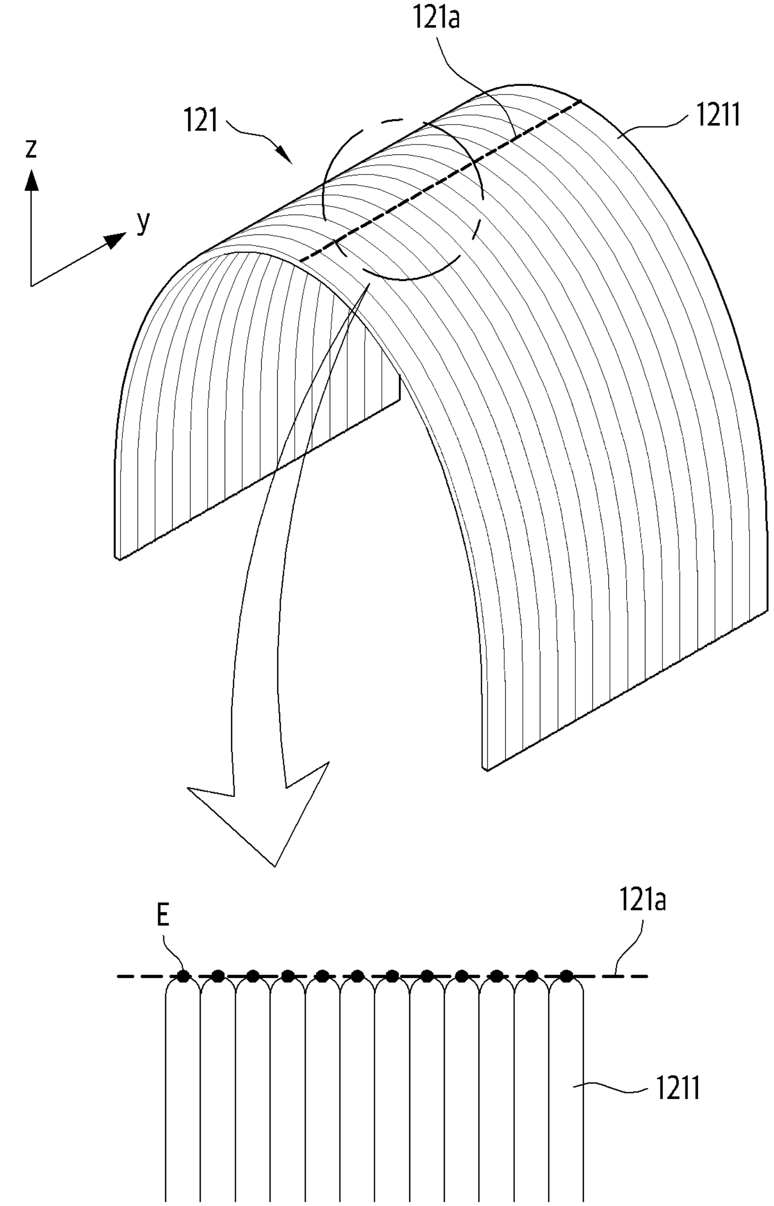

[FIG. 13]
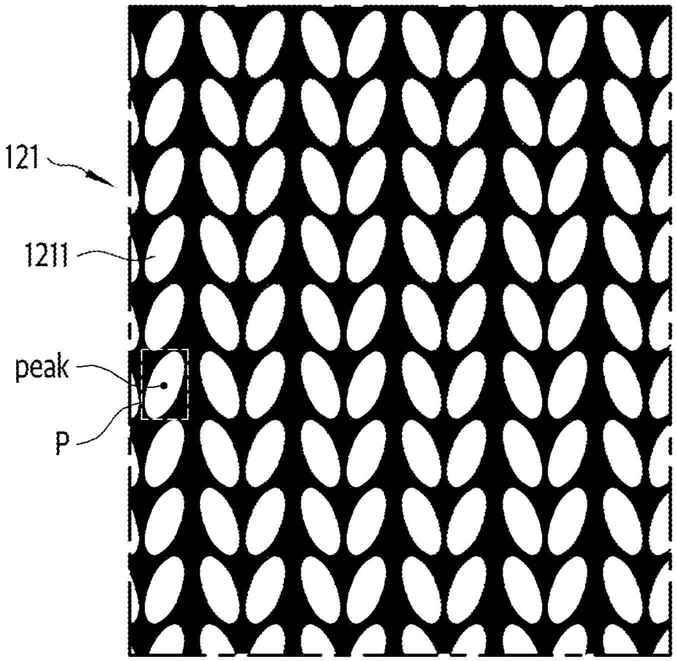

[FIG. 14]
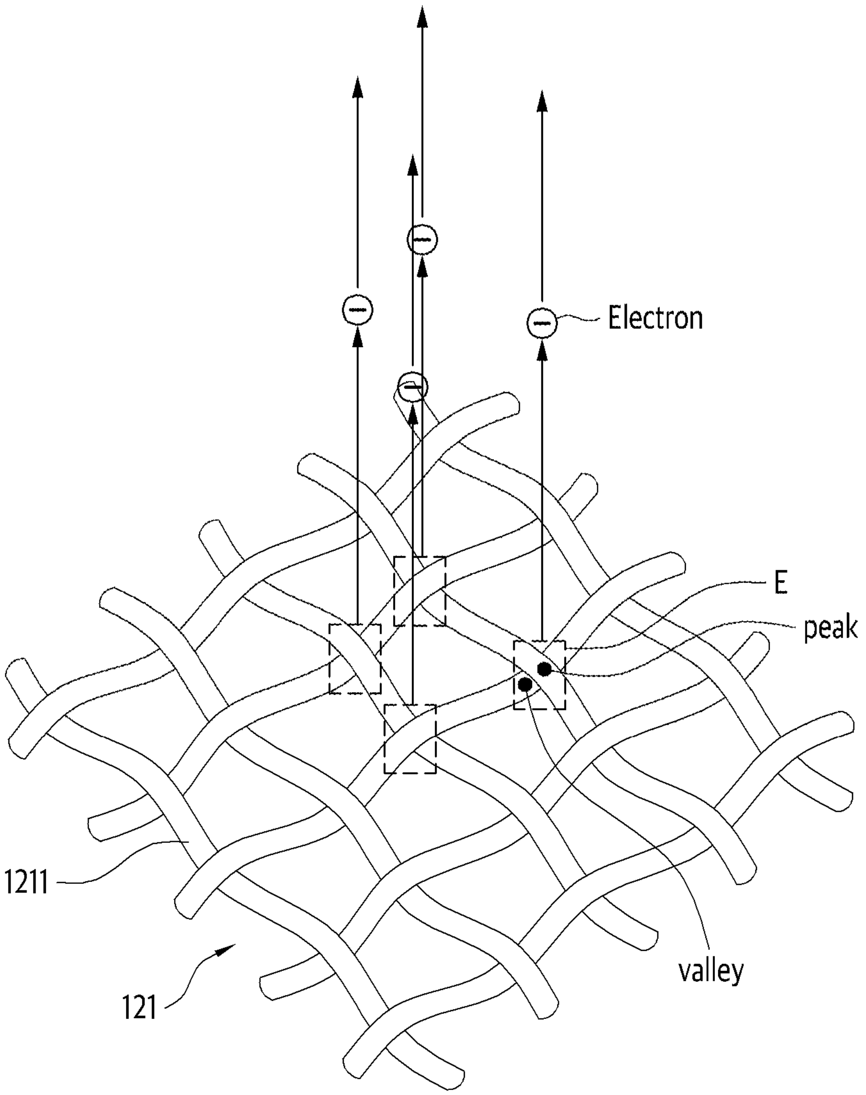

[FIG. 15]
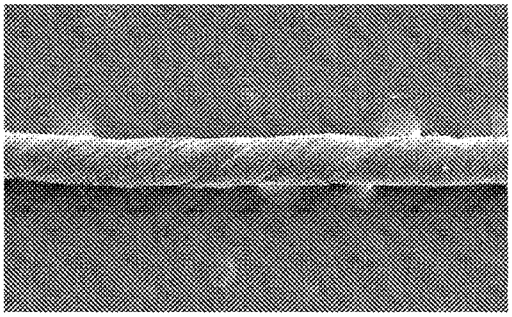
(a)
Twisted Yarn
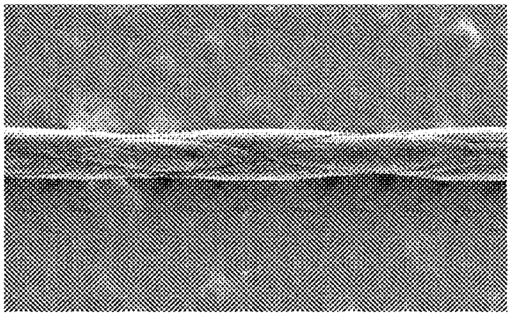
(b)
Braided Yarn

[FIG. 16]
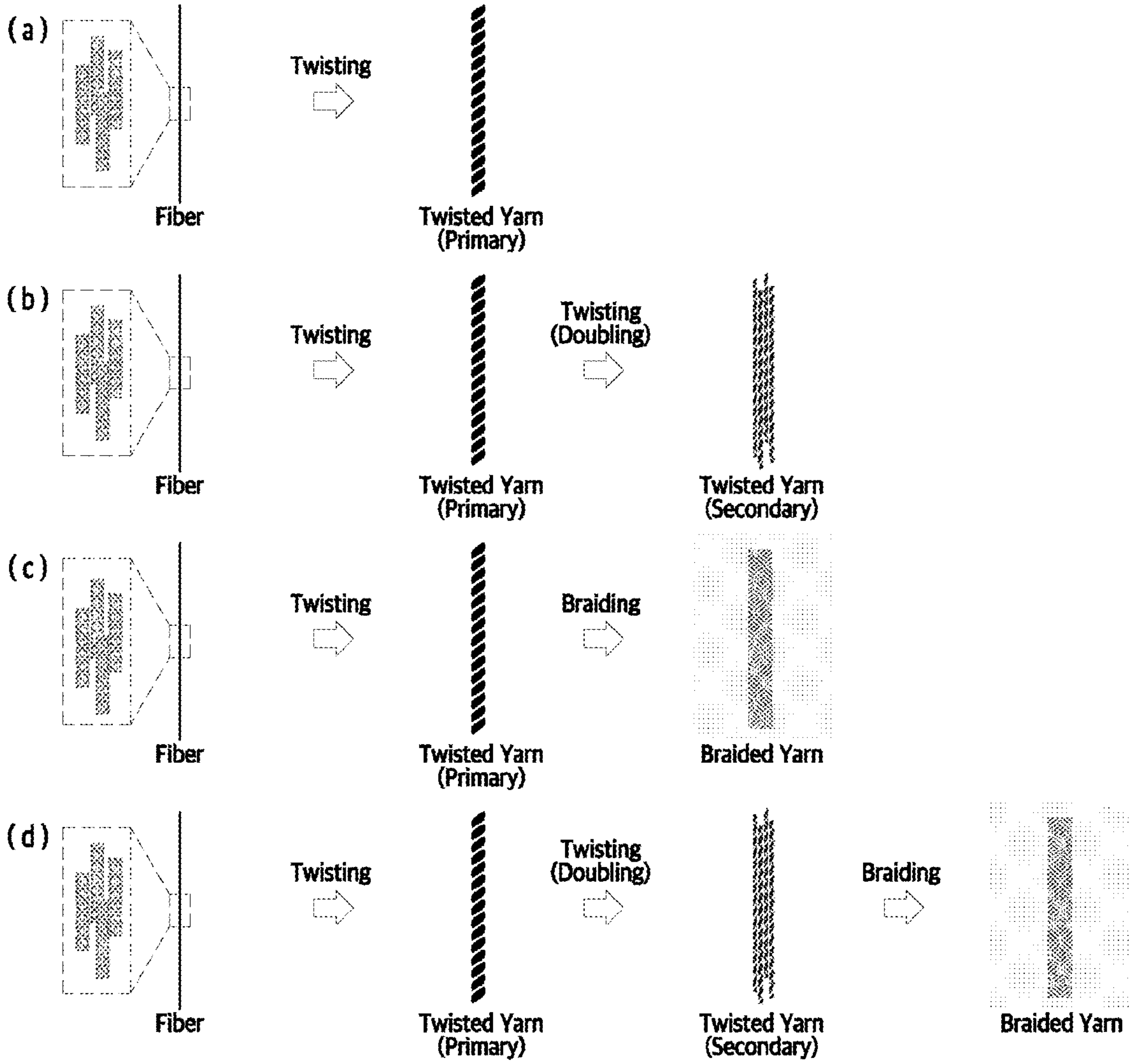

[FIG. 17]
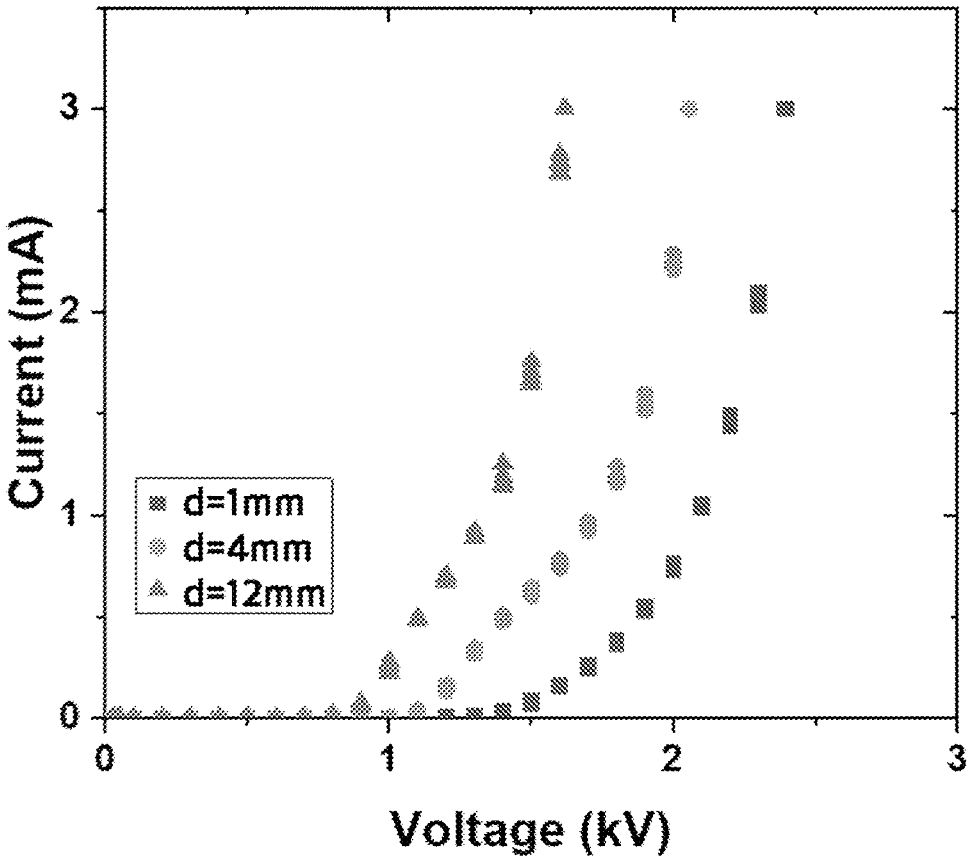

[FIG. 18]
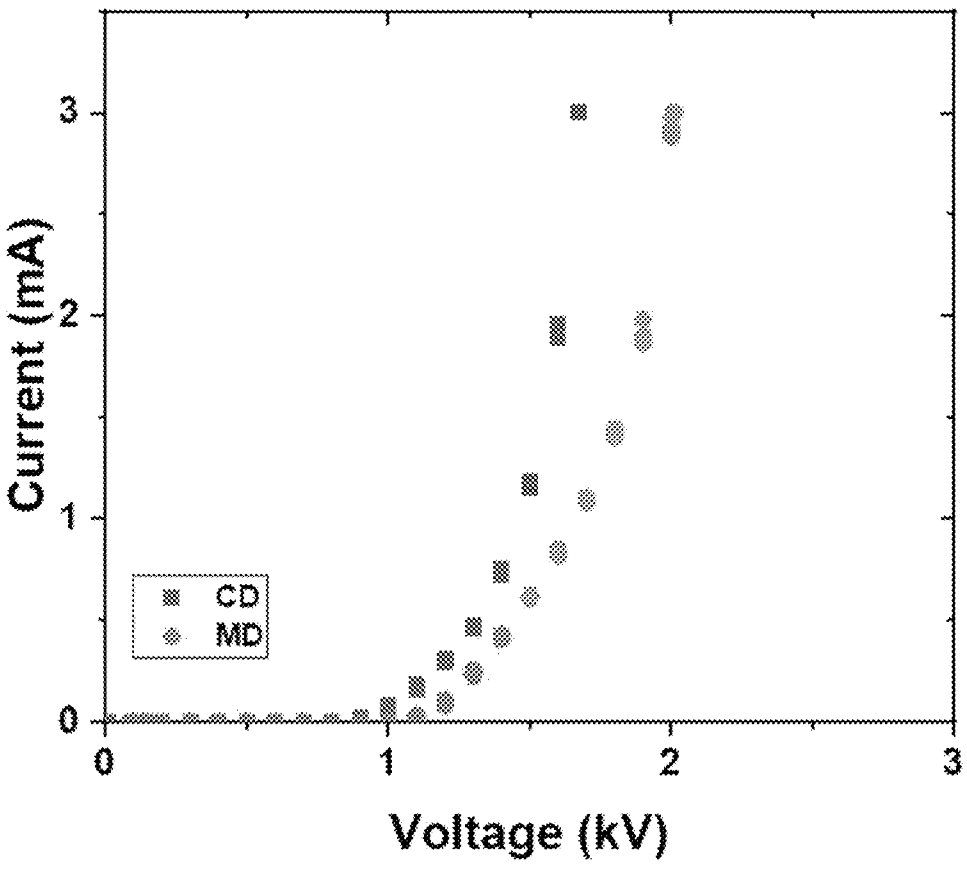

[FIG. 19]
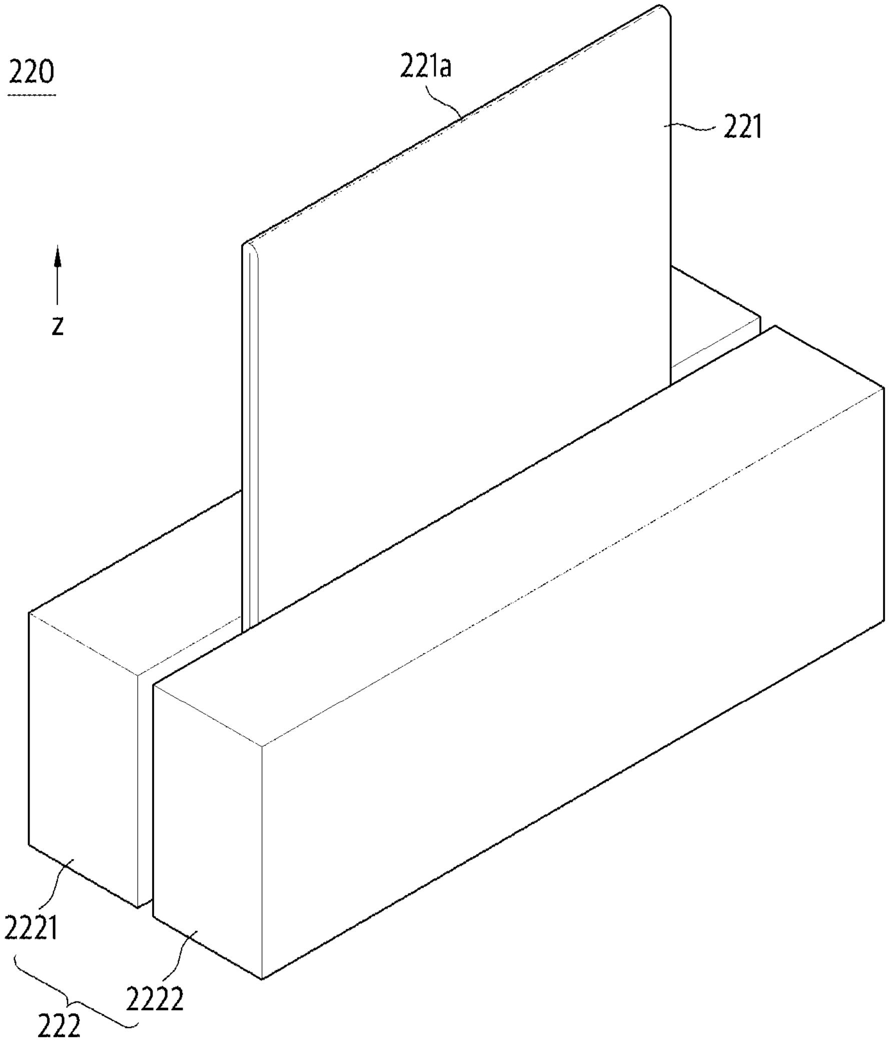

[FIG. 20]
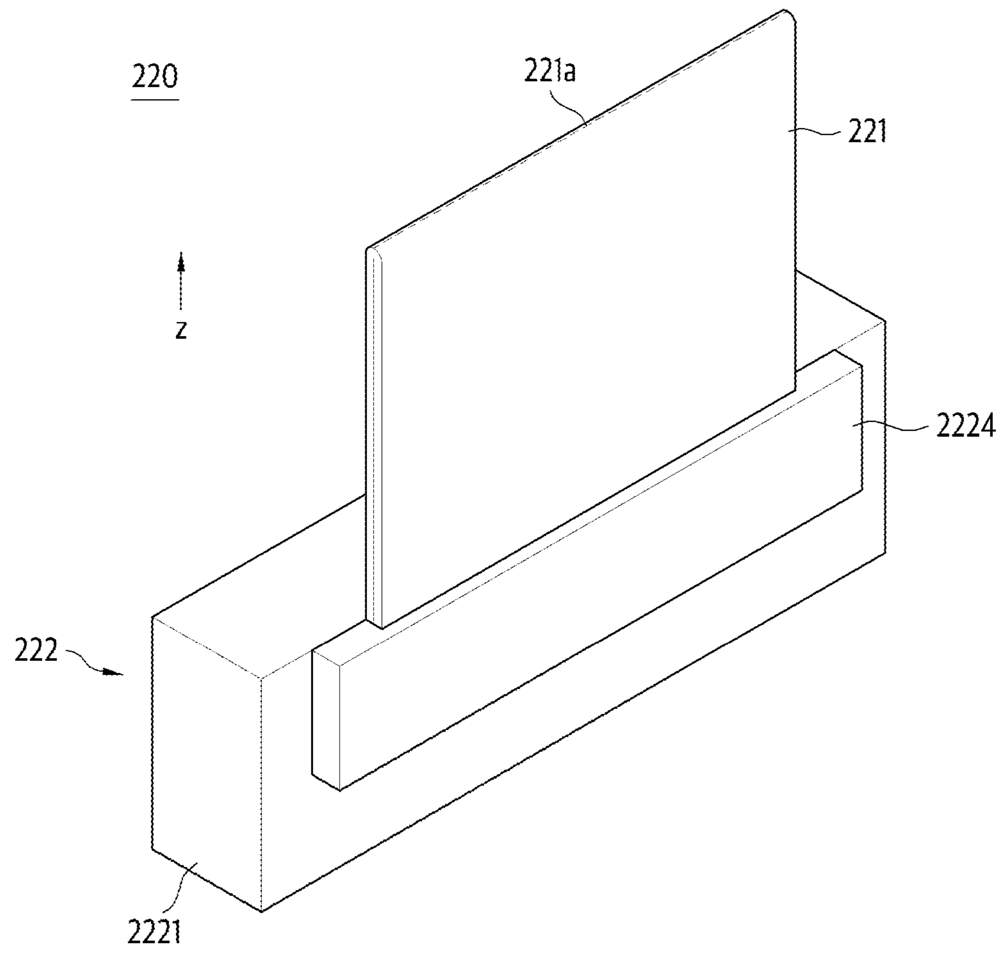

EMITTER AND FIELD EMISSION ASSEMBLY INCLUDING THE SAME

BACKGROUND

Technical Field

Example embodiments relate to an emitter, a field emission assembly and an apparatus for generating electromagnetic waves including the emitter and the field emission assembly. More specifically, example embodiments relate to a field emission assembly may increase the amount of electron emission and equalize the electronic field emission characteristics through a structure of an emitter, and an apparatus for generating electromagnetic waves including the same.

Description of the Related Art

Recently, with the development of carbon nanotube (CNT) technology, a technology has been developed to replace the cathode of an existing X-ray tube using a thermoelectron emission method using an existing filament with a cold cathode using carbon nanotube.

Generally, carbon nanotube-based X-ray tubes consist of a cathode part containing an emitter made of carbon nanotube, a gate that induces the emission of electrons, a focusing electrode that improves electron focusing performance and an anode part that generates electromagnetic waves (specifically, X-rays) by collision of emitted electrons.

The electronic field emission characteristics required for the apparatus for generating electromagnetic waves may vary depending on the intended use. For example, while the apparatus for generating electromagnetic waves used to detect breast cancer requires a large amount of X-rays, in other specific cases, X-ray emission of less intensity may be required. This is because when the intensity of X-rays becomes stronger, X-rays may penetrate even a target that is to be detected and the target may not be detected.

With regard to the apparatus for generating electromagnetic waves, the amount of emitted electrons, collision speed and focal spot size are determined based on the voltage, geometry and location of each part, and therefrom, the resolution and image quality of the radiological image are determined. Specifically, in the case of an emitter that is made of carbon nanotube-based material and serves as a source of electron emission, the amount of electron emission and/or field emission uniformity may depend on the shape or combining structure of the emitter.

In a cold cathode X-ray tube using existing carbon nanotube, a field emission assembly is used in which linear yarns are cut to a certain length and the yarns are fixed to the holder so that the cut surfaces face an anode part. When an electronic field is generated in this X-ray tube, electrons may be emitted from the cut surfaces of the yarns.

BRIEF SUMMARY

The inventors of the present disclosure have recognized that with respect to the existing field emission assembly, the area of the cut surfaces of the linear yarns facing the anode is not large, and thus the amount of electron emission is insufficient. Further, the cut surfaces of the linear yarns made of CNT fibers are not always constant. Accordingly, the inventors have appreciated that there is a limit to the uniformity of electronic field emission characteristics and to the lifespan of an apparatus for generating electromagnetic waves. Further, the inventors have also appreciated that as the uniformity of electronic field emission characteristics decreases, there are limits to precisely adjusting the amount or intensity of electromagnetic waves.

An aspect provides an emitter by which strong electromagnetic waves are generated by improving the amount of electron emission, a field emission assembly and an apparatus for generating electromagnetic waves including the emitter and the field emission assembly.

Another aspect also provides an emitter that may improve the uniformity of the electronic field emission characteristics and the lifespan of an apparatus for generating electromagnetic waves, a field emission assembly and an apparatus for generating electromagnetic waves including the same.

Another aspect also provides an emitter that allows more precise adjustments to the amount or intensity of electromagnetic waves, a field emission assembly and an apparatus for generating electromagnetic waves including the same.

According to an aspect, there is provided an emitter that emits electrons in an apparatus for generating electromagnetic waves, wherein the emitter is formed in a form of a sheet including carbon nanotube, the emitter including at least one of a part curved to form a ridge in a direction of electron emission and a part bent to form a ridge in the direction of electron emission.

Through the aspect, by improving the electron emission amount by the emitter, it may be possible to generate stronger electromagnetic waves.

Further, the uniformity of the electronic field emission characteristics of the emitter and the lifespan of the apparatus for generating electromagnetic waves may be improved.

Further, as the uniformity of electronic field emission characteristics improves, adjustment of the amount or intensity of electromagnetic waves generation may be performed more precisely.

According to an example embodiment, the curved part or the bent part may form a single ridge.

According to an example embodiment, centered on the ridge, both sides may converge as the both sides progress towards the direction of electron emission, or the both sides may converge while having a parallel area.

According to an example embodiment, the emitter may have a shape in which a slope of a tangent changes continuously.

According to an example embodiment, if the emitter includes the curved part to form the ridge in the electron emission direction, based on a cross section that intersects the ridge, a radius of curvature at the ridge may be smaller than a radius of curvature of other parts.

According to an example embodiment, if the emitter includes the bent part to form the ridge in the direction of electron emission, based on the ridge, a concave shape dented toward a center may be formed in each of the both sides.

According to an example embodiment, the emitter may include a plurality of yarns including carbon nanotube fibers.

According to an example embodiment, the plurality of yarns extending in a first direction may be arranged in a second direction that intersects the first direction.

According to an example embodiment, the ridge may be formed parallel to the first direction.

According to an example embodiment, the ridge may be formed parallel to the second direction.

According to an example embodiment, the plurality of yarns may be woven to form the emitter.

According to another aspect, there is provided a field emission assembly that includes: an emitter that is in a form of a sheet including carbon nanotube; and a holder that fixes the emitter, wherein the emitter in the form of the sheet includes at least one of a part curved to form a ridge in a direction of electron emission and a part bent to form a ridge in the direction of electron emission.

According to an example embodiment, the emitter may be electrically connected to the holder by at least one of a manner that the emitter is pressed by the holder, a manner that the emitter is welded to the holder and a manner that the emitter is attached to the holder by adhesive.

According to an example embodiment, the emitter may have two ends that are spaced apart from each other centered on the ridge and fixed to the holder.

According to an example embodiment, the holder may include a body part, and the two ends of the emitter may be in close contact with both sides of the body part, respectively.

According to an example embodiment, the holder may include a first fixing part disposed on one side of the body part and a second fixing part disposed on an opposite side of the body part, and an end of the emitter may be disposed between the body part and the first fixing part and an opposite end of the emitter may be disposed between the body part and the second fixing part.

According to an example embodiment, the two ends of the emitter centered on the ridge may be adjacent to each other and are fixed to the holder.

According to an example embodiment, the holder may include a first body part, and the two ends of the emitter may be in close contact with one side surface of the first body part.

According to an example embodiment, the holder may include a second body part disposed on one side of the first body part, and the two ends of the emitter may be disposed between the first body part and the second body part.

According to an example embodiment, the emitter may have a length in a direction of the ridge and the length may be greater than a height to which the emitter protrudes from the holder.

According to an example embodiment, an angle formed by tangents of two sides of the emitter that beings to protrude from the holder may be 0° to 180°.

According to example embodiments, it is possible to generate stronger electromagnetic waves by improving the electron emission amount with an emitter.

According to example embodiments, it is possible to improve the uniformity of the electronic field emission characteristics of an emitter and the lifespan of an apparatus for generating electromagnetic waves.

Further, according to example embodiments, as the uniformity of electronic field emission characteristics improves, adjustment of the amount or intensity of electromagnetic waves generation may be performed more precisely.

BRIEF DESCRIPTION OF THE SEVERAL VIEWS OF THE DRAWINGS

FIG. 1 is a conceptual diagram of an apparatus for generating electromagnetic waves including a field emission assembly according to an example embodiment.

FIG. 2 is a perspective view showing a field emission assembly according to an example embodiment.

FIG. 3 is a cross-sectional view showing a field emission assembly according to an example embodiment.

FIG. 4 is a perspective view showing a field emission assembly according to another example embodiment.

FIG. 5 is a cross-sectional view showing a field emission assembly according to another example embodiment.

FIG. 6 illustrates various aspects of an emitter of a field emission assembly according to an example embodiment.

FIG. 7 is an enlarged illustration of an emitter of a field emission assembly according to an example embodiment.

FIG. 8 is an enlarged illustration of another example of an emitter according to an example embodiment.

FIG. 9 illustrates a method for manufacturing an emitter according to an example embodiment.

FIG. 10 illustrates a method of manufacturing an emitter according to an example embodiment.

FIGS. 11 and 12 illustrate various aspects of an emitter of a field emission assembly according to an example embodiment.

FIG. 13 illustrates an emitter of a field emission assembly according to another example embodiment.

FIG. 14 is an enlarged view of area P of the emitter illustrated in FIG. 13.

FIG. 15 shows pictures of yarns constituting the emitter of a field emission assembly according to an example embodiment.

FIG. 16 illustrates a method of forming an emitter of a field emission assembly according to an example embodiment.

FIG. 17 is a graph illustrating electronic field emission characteristics according to exposed areas of an emitter of a field emission assembly according to an example embodiment.

FIG. 18 is a graph illustrating electronic field emission characteristics according to the direction in which a ridge of an emitter of a field emission assembly is formed according to an example embodiment.

FIG. 19 is a perspective view illustrating a field emission assembly according to an example embodiment.

FIG. 20 is a perspective view illustrating a field emission assembly according to another example embodiment.

DETAILED DESCRIPTION

Terms used in the example embodiments are selected from currently widely used general terms when possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

The suffixes "module" and "part" for the components used in the following description are given or mixed in consideration of the ease of writing the specification, and do not have distinct meanings or roles by themselves. In addition, in describing the example embodiments disclosed in the specification, if it is determined that detailed description of related known technologies may obscure the gist of the example embodiments disclosed in the specification, the detailed description thereof will be omitted. In addition, the accompanying drawings are only for easy understanding of the example embodiments disclosed in the specification, and the technical idea disclosed herein is not limited by the accompanying drawings, and all modifications included in the scope of the present disclosure should be understood to include equivalents or substitutes.

The terms such as "first" and "second" as used herein may use corresponding components regardless of importance or an order and are used to distinguish a component from another without limiting the components. These terms may be used for the purpose of distinguishing one element from another element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element.

A singular expression includes a plural expression unless the context clearly dictates otherwise.

In implementing the present disclosure, it will be further understood that the terms "comprise," "include" or "have" when used herein, specify the presence of stated features, integers, steps, operations, elements, and/or components, but do not preclude the presence or addition of one or more other features, integers, steps, operations, elements, components, and/or groups thereof.

Expression "at least one of a, b and c" described throughout the specification may include "a alone," "b alone," "c alone," "a and b," "a and c," "b and c" or "all of a, b and c."

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

Hereinafter, example embodiments of the present disclosure will be described in detail with reference to the accompanying drawings.

FIG. 1 is a conceptual diagram of an apparatus for generating electromagnetic waves including a field emission assembly according to an example embodiment.

An apparatus 100 for generating electromagnetic waves according to a first example embodiment of the present disclosure includes a housing 110, a field emission assembly 120, a gate electrode 130, a focusing part 140 and an anode 150. However, the apparatus may be implemented with some of the elements omitted, and some other additional elements may also be included.

Hereinafter, the electron emission direction (z) may be understood as a direction from the field emission assembly 120 toward the anode 150. In other words, the electron emission direction (z) may be understood as an upward direction based on FIGS. 1 to 5.

Referring to FIG. 1, the apparatus 100 for generating electromagnetic waves may include the housing 110. The housing 110 may accommodate elements such as the field emission assembly 120, the gate electrode 130 and the anode 150. The inside of the housing 110 may be maintained in a vacuum state, or close to a vacuum state.

The housing 110 may be provided with an irradiation part 111. Electromagnetic waves generated at the anode 150 may be emitted to the outside of the housing 110 through the irradiation part 111. However, in contrast, the housing 110 may be formed entirely of a transparent material such as glass so that electromagnetic waves generated in the anode 150 may pass through. In this case, the irradiation part 111 that is separate may not be prepared. Further, if the strength of the generated electromagnetic waves is strong, the electromagnetic waves may pass through opaque materials. Thus, the housing 110 may be formed of an opaque material without the irradiation part 111.

The apparatus 100 for generating electromagnetic waves may include the field emission assembly 120. The field emission assembly 120 may be a part that emits electrons by an electric field. The field emission assembly 120 may serve as a cathode to which a negative voltage is applied.

The field emission assembly 120 may include an emitter 121 that emits electrons and a holder 122 that fixes the emitter 121. The specific structure of the field emission assembly 120 will be described in detail later with reference to FIGS. 2 to 5.

The field emission assembly 120 of the apparatus 100 for generating electromagnetic waves according to an example embodiment may be a cold cathode. Specifically, in the apparatus 100 for generating electromagnetic waves according to an example embodiment, electrons contained in the emitter 121 may be emitted by the voltage applied between the field emission assembly 120 and the gate electrode 130 without applying additional heat to the emitter 121.

The apparatus 100 for generating electromagnetic waves may include the gate electrode 130. The gate electrode 130 may be disposed between the emitter 121 and the anode 150. More specifically, the gate electrode 130 may be disposed closer to the emitter 121 between the emitter 121 and the anode 150.

The gate electrode 130 may induce electron emission from the emitter 121. Electrons contained in the emitter 121 may be emitted by a voltage applied between the gate electrode 130 and the emitter 121. The gate electrode 130 may play the role of preferentially drawing electrons from the emitter 121.

However, without being limited thereto, the apparatus 100 for generating electromagnetic waves may not include the gate electrode 130. In this case, electrons contained in the emitter 121 may be emitted by a voltage applied between the focusing part 140 that is to be described later and the field emission assembly 120. Alternatively, electrons contained in the emitter 121 may be emitted by a voltage applied between the anode 150 and the field emission assembly 120.

The apparatus 100 for generating electromagnetic waves may include the focusing part 140. The focusing part 140 may be placed between the gate electrode 130 and the anode 150, or between the field emission assembly 120 and the anode 150.

The focusing part 140 may serve to focus the electron beam that has passed through the gate electrode 130 as a voltage is applied. The focusing part 140 may be referred to as a lens. Further, the focusing part 140 may further accelerate the electron beam that passed through the gate electrode 130. Specifically, when voltage occurs between the focusing part 140 and the gate electrode 130, electrons passing through the gate electrode 130 may be accelerated by an electric field formed by a voltage applied between the focusing part 140 and the gate electrode 130. As such, the apparatus 100 for generating electromagnetic waves provided with the focusing part 140 may be referred to as a triode type.

However, the apparatus 100 for generating electromagnetic waves is not limited thereto. If the focusing performance of the gate electrode 130 itself is good or excellent, the focusing part 140 may not be provided. As such, the apparatus 100 for generating electromagnetic waves without the focusing part 140 may be referred to as a diode type.

The apparatus 100 for generating electromagnetic waves may include the anode 150. The anode 150 may be placed on the opposite side of the field emission assembly 120 in the inner space of the housing 110. The anode 150 may be disposed behind the gate electrode 130 and/or the focusing part 140 in the direction of electron beam travel. The anode 150 is a part to which a positive voltage (+) is applied and may be referred to as a positive electrode part. The anode 150 may also be referred to as a target in the sense that it is a target that the electron beam hits.

Electromagnetic waves may be formed at the anode 150. Specifically, the electron beam emitted from the emitter 121 may be accelerated while passing through the gate electrode 130 and/or the focusing part 140 and then collide to the anode 150. Here, the electron beam may generate electromagnetic waves by exciting the material constituting the anode 150 into an excited state and then returning it to its original state.

Electromagnetic waves emitted by the apparatus 100 for generating electromagnetic waves may have a wavelength of 0.001 nm to 10 nm. For example, the apparatus 100 for generating electromagnetic waves may emit X-rays with a wavelength of 0.001 nm to 10 nm. More specifically, the apparatus 100 for generating electromagnetic waves may emit X-rays with a wavelength of 0.01 nm to 10 nm.

FIG. 2 is a perspective view showing a field emission assembly according to an example embodiment. FIG. 3 is a cross-sectional view showing a field emission assembly according to an example embodiment. FIG. 4 is a perspective view showing a field emission assembly according to another example embodiment. FIG. 5 is a cross-sectional view showing a field emission assembly according to another example embodiment. FIG. 6 illustrates various aspects of an emitter of a field emission assembly according to an example embodiment.

Referring to FIGS. 2 to 5, the field emission assembly 120 may include the emitter 121. The emitter 121 may be fixed to the holder 122. The emitter 121 may be energized by contacting the holder 122. Specifically, the emitter 121 may be electrically connected to the holder 122 by a method that the emitter 121 is pressed into the holder 122, a method that the emitter 121 is welded to the holder 122 or a method that the emitter 121 is attached to the holder 122 by adhesive. When an electric field is applied to the apparatus 100 for generating electromagnetic waves, electrons may move to the emitter 121 through the holder 122 and then may be emitted from the emitter 121. The emitter 121 may include carbon nanotube fibers through which electrons can easily move. Not limited thereto, the emitter 121 may be formed of various materials capable of emitting electrons.

The field emission assembly 120 according to an example embodiment may include the emitter 121 and the holder 122. However, the field emission assembly 120 may be implemented without one of the elements. Further, additional elements are not excluded.

The emitter 121 may be in the form of a sheet. As the emitter 121 is in the form of a sheet, the area from which electrons can be emitted increases, so a large amount of electron emission may be induced. Accordingly, the emitter 121 in the form of a sheet may generate a large amount of electromagnetic waves. The emitter 121 in the form of a sheet may be particularly useful in specific fields that require a large amount of electromagnetic waves, such as breast cancer detection.

The emitter 121 may include carbon nanotube. Specifically, the emitter 121 may include a plurality of yarns 1211 including carbon nanotube (CNT) fibers. A yarn 1211 may be a linear material formed by gathering carbon nanotube fibers. The yarn 1211 may be a non-twisted yarn formed by simply gathering a plurality of carbon nanotube fibers, a twisted yarn or a braided yarn. Methods of forming the yarn 1211 when the yarn 1211 is formed of a twisted yarn and a braided yarn will be described in detail with reference to FIGS. 15 and 16.

The plurality of yarns 1211 constituting the emitter 121 in the form of a sheet may have various structures. For example, the emitter 121 may have a structure in which the plurality of yarns 1211 extending in one direction are arranged side by side. In this case, it may be particularly preferable that each yarn 1211 is a non-twisted yarn, but it is not excluded that each yarn 1211 is a twisted or braided yarn, nor a combination of at least two of non-twisted yarn, a twisted yarn and a braided yarn is excluded.

Alternatively, the emitter 121 may have a structure in which the plurality of yarns 211 are woven together. In this case, it may be particularly preferable that each yarn 1211 is a non-twisted yarn, a twisted yarn or a braided yarn. However, each yarn 1211 may be composed of a combination of at least two among a non-twisted yarn, a twisted yarn and a braided yarn.

Alternatively, the emitter 121 may have a structure in which a plurality of yarns 1211 are arbitrarily entangled with each other. In this case, it may be particularly preferable that each yarn 1211 is a non-twisted yarn, a twisted yarn or a braided yarn. However, each yarn 1211 may be composed of a combination of at least two among a non-twisted yarn, a twisted yarn and a braided yarn.

The emitter 121, which has a structure in which a plurality of yarns 1211 extending in one direction are arranged side by side, will be described in detail later with reference to FIGS. 7 to 12. The emitter 121, which has a structure in which a plurality of yarns 1211 are woven together, will be described in detail later with reference to FIGS. 13 and 14.

The emitter 121 may include at least one of a curved part to form a ridge 121*a* in the electron emission direction (z) and a part bent to form the ridge 121*a* in the electron emission direction (z). In other words, the emitter 121 may include a curved part that is convex in the electron emission direction (z), or include a part bent to protrude in the electron emission direction (z), or include both curved part and the bent part. The ridge 121*a* may indicate a point that protrudes in the electron emission direction (z) relative to the surrounding area.

When an electric field is applied to the emitter 121, electrons contained inside the emitter 121 and/or electrons transferred from the holder 122 to the emitter 121 may be guided to an area 121*b* near the ridge of the emitter 121 that protrudes in the electron emission direction (z), and may be emitted to the outside of the emitter 121.

For example, the emitter 121 may have a shape in which the slope of the tangent continuously changes. This may indicate that the emitter 121 has a shape that curves smoothly without any sharp bends. In this case, because the movement of electrons inside the emitter 121 may become smoother, electrons may be effectively emitted. The emitter 121 may include a curved part which has a shape in which the slope of the tangent continuously changes. The emitter 121 may include a part bent which has a shape in which the slope of the tangent discontinuously changes.

For another example, the emitter 121 may include a bent part (or, a sharply bent part). Here, it may be desirable for the emitter 121 to be bent to form the ridge 121*a* in the electron emission direction (z). Specifically, when an electric field is applied to the emitter 121, electrons may be induced from the emitter 121 to a protruding portion in the electron emission direction (z), and may be emitted outside of the emitter 121. Here, if the emitter 121 includes a bent part so that a ridge is formed in the electron emission direction (z), electrons may be easily concentrated at the bent part of the emitter 121. Accordingly, since the repulsive force between the electrons can increase, the electrons can be easily emitted to the outside of the emitter 121. Further, since electrons are concentrated and emitted at the bent point, the location of the electron emitting point may be easily adjusted.

Hereinafter, the field emission assembly 120 according to an example embodiment will be described in detail.

Hereinafter, in the field emission assembly 120 according to an example embodiment in the present disclosure, since the emitter 121 has one ridge 121*a*, the ridge 121*a* may be the same point as the forefront (hereinafter, a "front end 121*a*") of the emitter 121 in the electron emission direction (z).

Referring to FIGS. 2 to 5, the emitter 121 of the field emission assembly 120 according to an example embodiment may be curved to form the ridge 121*a* in the electron emission direction (z), or may be bent to form the ridge 121*a* in the electron emission direction (z). Based on FIG. 1, the emitter 121 may be curved to form the ridge 121*a* toward the anode 150 (illustrated in FIG. 1), or may be bent to form the ridge 121*a* toward the anode 150 (illustrated in FIG. 1). The emitter 121 of the field emission assembly 120 according to an example embodiment may be understood as being curved to have one ridge 121*a* or bent to have one ridge 121*a*. The emitter 121 having a single ridge 121*a* has a simple shape, and thus the field emission assembly 120 may be manufactured consistently. Therefrom, the uniformity of electronic field emission characteristics and the lifespan of the apparatus 100 for generating electromagnetic waves may be improved.

When an electric field is applied to the emitter 121, electrons contained inside the emitter 121 and/or electrons transferred from the holder 122 to the emitter 121 may be guided to an area (hereinafter, an "front side portion 121*b*") near the front end 121*a* in the electron emission direction (z) of the emitter 121, and then the electrons may be emitted from the front side portion 121*b* to the outside of the emitter 121.

With the electron emitting method, non-uniformity due to cutting of the emitter 121 may be eliminated. Accordingly, the uniformity of electronic field emission characteristics and the lifespan of the apparatus 100 for generating electromagnetic waves may be improved. Further, due to improved uniformity of electronic field emission characteristics, adjustment of the amount or intensity of electromagnetic waves generation may be performed more precisely. Further, as electrons are emitted across the ridge 121*a* and/or the area 121*b* near the ridge, the area where electrons can be emitted may expand, and thus a sufficient amount of electron emission may be secured.

Centered on the ridge 121*a* of the emitter 121, both sides of the emitter 121 may converge as the both sides progress towards the electron emission direction (z). However, some areas of the emitter 121 may be parallel. Referring to FIG. 1, centered on the front end 121*a* of the emitter 121 in the electron emission direction (z), both sides of the emitter 121 may converge as both sides progress towards the anode 150 (illustrated in FIG. 1), but some areas of the emitter 121 may be parallel. In other words, the emitter 121 may not form parts that move away from each other in the electron emission direction (z) based on both ends that are fixed to the holder 122. Therefrom, electrons contained inside the emitter 121 may be more easily guided to the anterior part 121*b* of the emitter 121.

In contrast, centered on the ridge 121*a* of the emitter 121, both sides of the emitter 121 may include some parts that diverge as the both sides towards the electron emission direction (z) (for example, when viewed from the front of the emitter, the emitter is shaped like a ring). For example, in a case where both ends of the emitter 121 are fixed, if the radius of curvature of the front end 121*a* in the electron emission direction (z) of the emitter 121 increases above a certain level according to the required electronic field emission characteristics, or in a case where the radius of curvature of the front end 121*a* of the emitter 121 in the electron emission direction (z) is fixed, if the gap between a first fixing part 1222 and a second fixing part 1223 is narrowed beyond a certain level due to structural constraints, a part may be formed that protrude further to both sides than both ends of the emitter 121, and in this case, the emitter 121 may include parts that diverge as the both sides towards the electron emission direction (z).

The emitter 121 may be formed left-right symmetrically. Specifically, the emitter 121 may be formed symmetrically with respect to the ridge 121*a*. Therefrom, the uniformity of the shape of the emitter 121 may be improved, and this may indicate that the uniformity of electronic field emission characteristics and the lifespan of the apparatus 100 for generating electromagnetic waves are improved.

The length (d) of the emitter 121 in the direction of the ridge 121*a* may be greater than the height (h) at which the emitter 121 protrudes from the holder 122. In other words, when viewing the field emission assembly 120 illustrated in FIG. 2 from the side, the width (d) of the emitter 121 may be greater than the height (h) of the emitter 121 protruding from the holder 122. Through the structure, the ridge 121*a* through which electrons are emitted is sufficiently secured so that electrons emitted smoothly. Thus, the amount of electron emission may be improved. The amount of electron emission depending on the width of the emitter 121 will be described in detail later with reference to FIG. 17.

The emitter 121 in the form of a sheet may be curved or bent in various ways and fixed to the holder 122. In an example embodiment, one may directly apply force to the emitter 121 in the form of a sheet or apply force to the emitter 121 through a separately provided folding apparatus to curve or bend the emitter 121 into an appropriate shape, and then fix the emitter 121 to the holder 122. In another example embodiment, the emitter 121 may be fixed to the holder 122 in a manner that with one end of the emitter 121 in a flat state fixed to the holder 122, the emitter 121 is curved or bent into an appropriate shape by a person directly or using a separately provided folding apparatus and then an opposite end of the emitter 121 is also fixed to the holder 122.

Hereinafter, the radius of curvature (R) of the emitter 121 will be described in detail through (a) of FIG. 6 and (b) of FIG. 6.

FIG. 6 shows cross-sectional views of the emitter 121 cut along a plane that intersects the ridge 121*a* of the emitter 121.

The emitter 121 may be bent or curved depending on required electronic field emission characteristics. When the emitter 121 is curved, the radius of curvature (R) of the front end 121*a* of the emitter 121 in the electron emission direction (z) may be formed in various ways.

For example, as illustrated in (a) of FIG. 6, when the front end 121*a* of the emitter 121 in the electron emission direction (z) is curved with a large radius of curvature (R), the front side portion 121*b* of the emitter 121 in the electron emission direction (z) may be formed in a blunt shape. In this case, a threshold voltage (Threshold Voltage) value at which electrons begin to be emitted and the maximum current (Max Current) value, which is the maximum value of the current formed due to the emitted electrons, may be increased.

On the other hand, when the front end 121*a* of the emitter 121 in the electron emission direction (z) is curved with a small radius of curvature (R) or bent as illustrated in (b) of FIG. 6, the front side portion 121*b* of the emitter 121 in the electron emission direction (z) may be formed into a more pointed shape. In this case, the threshold voltage value at which electrons begin to be emitted and the maximum current value, which is the maximum value of the current formed due to the emitted electrons, may be lowered.

The radius of curvature of the emitter 121 is not required to be the same depending on the area. In other words, the emitter 121 may have a different radius of curvature depending on the area. The curved shape of the emitter 121 may be determined according to thickness of the emitter 121 that is in the form of a sheet, size, distance between the two fixed ends, fixed angles at both fixed ends, and type of sheet emitter 121 to be described in FIGS. 7 to 16. Furthermore, if permanent transformation occurs due to external force, the emitter 121 may have a corresponding shape.

When the emitter 121 includes a curved part such that the ridge 121*a* is formed in the electron emission direction (z), based on the cross section that intersects the ridge 121*a* of the emitter 121, the radius of curvature (R) at the ridge 121*a* of the emitter 121 may be formed to be smaller than the radius of curvature of other parts of the emitter 121. A small radius of curvature may indicate that it curves sharply. In order for electrons to be smoothly guided to the front side portion 121*b* of the emitter 121 by the electric field, it may be desirable that parts other than the front end 121*a* of the emitter 121 in the electron emission direction (z) are curved as gently as possible compared to the front end 121*a* of the emitter 121 in the electron emission direction (z).

Hereinafter, the curve angle (a) of the emitter 121 will be described in detail through (a) of FIG. 6 and (c) of FIG. 6.

Referring to FIG. 6, the emitter 121 may be formed at various curved angles (a) depending on how it is fixed to the holder. Here, the curve angle (a) may be the angle formed by the tangent lines of both side parts of the emitter 121 that protrude from the holder. The curve angle (a) of the emitter 121 may be 0° to 180°. Preferably it may be 0° to 90°, and more preferably 0° to 45°.

For example, as illustrated in (a) of FIG. 6, when both ends of the emitter 121 are fixed to the holder with a sufficient gap between the both ends, the curve angle (a) may be increased.

Conversely, when the both ends of the emitter 121 are fixed to the holder so that the ends are close to each other, and the gap between the two ends of the emitter 121 is narrow, the curve angle (a) may get smaller, and as illustrated in (c) of FIG. 6, tangent lines at both ends of the emitter 121 may be parallel to each other or may get closer to being parallel.

Further, referring to (d) of FIG. 6, when the emitter 121 includes a part bent to form the ridge 121*a* in the electron emission direction (z), based on the ridge 121*a*, a concave shape dented toward the center may be formed in each of the both sides. Through this structure, even when both ends of the emitter 121 are spaced apart from each other and fixed to the holder 122, the space occupied by the emitter 121 may be reduced to improve space efficiently. Further, even though both ends of the emitter 121 are spaced apart from each other, the ridge 121*a* of the emitter 121 may be formed to be sharper, and thus a threshold voltage value at which electrons begin to be emitted and a maximum current value which is the maximum value of current formed due to emitted electrons may become lower.

Hereinafter, structures in which the emitter 121 is fixed to the holder 122 will be described in detail through FIGS. 2 to 5.

The field emission assembly 120 may include the holder 122. The holder 122 may fix the emitter 121. Both ends of the emitter 121 of the field emission assembly 120 according to an example embodiment may be spaced apart from each other centered the ridge 121*a* and fixed to the holder 122.

The holder 122 may be formed of an electrically conductive material capable of conducting electricity. Specifically, the holder 122 may be made of a material that is electrically conductive and has a mechanical strength that is not deformed by the repulsive force of electrons accumulated in the field emission assembly 120. For example, the holder 122 may be made of one or more materials selected from the group consisting of tungsten, zinc, nickel, copper, silver, aluminum, gold, platinum, tin, stainless steel and conductive ceramics. When an electric field is applied to the field emission assembly 120, electrons may move to the emitter 121 through the holder 122 made of an electrically conductive material and then be emitted to the outside of the emitter 121.

The holder 122 may include a body part 1221. Both ends of the emitter 121 may be in close contact with both sides of the body part 1221, respectively. The body part 1221 may be provided in a box shape, as illustrated in FIGS. 2 to 5. However, the body part 1221 may have a structure in which the middle part is empty, or the body part 1221 may be composed of two members, one of which is in contact with the inside of one of the two ends of the emitter 121 and the other member is in contact with the inside of the other end of the emitter 121.

Referring to FIGS. 2 and 3, the holder 122 may include the first fixing part 1222. The first fixing part 1222 may be placed on one side of the body part 1221. The first fixing part 1222 may be adjacent to or tightly coupled to one side surface of the body part 1221. One end of the emitter 121 may be placed between the body part 1221 and the first fixing part 1222.

The holder 122 may include the second fixing part 1223. The second fixing part 1223 may be placed on the opposite side of the body part 1221. The second fixing part 1223 may be adjacent to or closely attached to the opposite side of the body part 1221. The other end of the emitter 121 may be placed between the body part 1221 and the second fixing part 1223.

The emitter 121 in the form of a sheet may be curved or bent to form the ridge 121*a* in the electron emission direction (z) and may be coupled to the holder 122 in a structure that surrounds a part of the body part 1221.

The emitter 121 may be fixed to the holder 122 in various ways. For example, both ends of the emitter 121 may be directly pressed and fixed by the body part 1221 and the first fixing part 1222 and the second fixing part 1223. For example, a coupling member (not illustrated) that penetrates the first fixing part 1222 and the second fixing part 1223 and is fastened to the body part 1221 may be provided, and as the coupling member is tightened, the gap between the body part 1221 and the first fixing part 1222 and the gap between the body part 1221 and the second fixing part 1223 narrow, and thus the emitter 121 may be compressed and fixed. For another example, both ends of the emitter 121 may be fixed to the holder 122 by being pressed by the ends of the coupling member that penetrates the first fixing part 1222 and the second fixing part 1223 and the sides of the body part 1221.

The body part 1221, the first fixing part 1222 and the second fixing part 1223 may each be provided as separate members. In this case, since the body part 1221, the first fixing part 1222 and the second fixing part 1223 can each be manufactured in a box shape, it may be easy to manufacture each member. Meanwhile, the body part 1221, the first fixing part 1222 and the second fixing part 1223 may be formed integrally. Even if the body part 1221, the first fixing part 1222 and the second fixing part 1223 are formed as one body, a gap into which the emitter 121 can be seated is still formed between the body part 1221 and the first fixing part 1222 and between the body part 1221 and the second fixing part 1223. In this case, since it may not be necessary to separately align the first fixing part 1222 and the second fixing part 1223 with respect to the body part 1221, the process of fixing the emitter 121 to the holder 122 may be easy.

Referring to FIGS. 4 and 5, unlike what is described above with reference to FIGS. 2 and 3, the holder 122 may not be provided with neither the first fixing part 1222 nor the second fixing part 1223.

Specifically, both ends of the emitter 121 may be attached to both sides of the body part 1221, respectively. For example, both ends of the emitter 121 may be welded to both sides of the body part 1221 using welding material 1224, respectively. For another example, both ends of the emitter 121 may be attached to both sides of the body part 1221 with adhesive 1224, respectively.

Further, unlike what is described above with respect to FIGS. 2 to 5, the holder 122 may not include the first fixing part 1222 and the second fixing part 1223, and the coupling member may be directly coupled to the sides of the body part 1221. In this case, with both ends of the emitter 121 in close contact with both sides of the body part 1221, a coupling member may be passed through both ends of the emitter 121 to be coupled to the sides of the body part 1221, and thus the emitter 121 may be fixed to the holder 122.

FIG. 7 is an enlarged illustration of an emitter of a field emission assembly according to an example embodiment. FIG. 8 is an enlarged illustration of another example of an emitter according to an example embodiment. FIG. 9 illustrates a method for manufacturing an emitter according to an example embodiment. FIG. 10 illustrates a method of manufacturing an emitter according to an example embodiment. FIGS. 11 and 12 illustrate various aspects of an emitter of a field emission assembly according to an example embodiment.

Hereinafter, the first direction (x) is a direction in which each of the plurality of yarns 1211 extends, and the second direction (y) is a direction in which the plurality of yarns 1211 is arranged and that intersects the first direction (x).

Referring to FIGS. 7 and 8, the emitter 121 may have a structure in which the plurality of yarns 1211 extending in the first direction (x) are arranged in the second direction (y), which is a direction intersecting the first direction (x).

The emitter 121 may be formed in an arrangement structure of the plurality of yarns 1211 in at least one layer. For example, as illustrated in FIG. 7, the emitter 121 may have a single-ply structure in which the plurality of yarns 1211 extending in the first direction (x) are arranged in the second direction (y). Further, as illustrated in FIG. 8, the emitter 121 may have a two-ply structure in which the plurality of yarns 1211 extending in the first direction (x) are arranged in the second direction (y). Not limited to this, the emitter 121 may be provided with a structure in which the plurality of yarns 1211 are arranged in three or more layers.

The process of manufacturing the emitter 121 illustrated in FIGS. 7 and 8 is as follows.

Referring to FIG. 9, the method of manufacturing the emitter 121 may include forming a preliminary sheet body 170 by winding the yarn 1211 on a winding part 160 provided in a cylindrical shape around an axis. Thereafter, the method of manufacturing the emitter 121 may include separating the preliminary sheet body 170 from the winding part 160. When the preliminary sheet body 170 is separated from the winding part 160, the preliminary sheet body 170 may approximately maintain the shape of a pipe.

When winding the yarn 1211 on the winding part 160, the yarn 1211 may be wound in one layer or in two or more layers along the outer circumference of the winding part 160. However, in order to achieve uniformity in the physical and electrical characteristics of the emitter 121, the yarn 1211 may be wound so as to be uniformly distributed over the entire winding area. In other words, even in the preliminary sheet body 170, the distance between the yarn 1211 and the yarn 1211 wound adjacently and continuously may be substantially uniform. From the bottom to the top of the preliminary sheet body 170, the yarn 1211 may be wound with the same number of plies.

The preliminary sheet body 170 may itself be self-supporting, and this may be due to the π-π interaction of the tightly wound yarn 1211 with other adjacent yarns 1211.

The emitter 121 in the form of a sheet may be formed by cutting and/or compressing the preliminary sheet body 170.

For example, referring to FIG. 9, when cutting one part of the side of the pipe-shaped preliminary sheet body 170 vertically (for example, cutting along A-A' illustrated in FIG. 9), as the pipe-shaped preliminary sheet body 170 is unfolded, the emitter 121 in the form of a sheet may be formed. Here, if the preliminary sheet body 170 has a structure in which the yarn 1211 is wound into a single layer, as illustrated in FIG. 7, the emitter 121 in the form of a sheet in which the plurality of yarns 1211 are arranged in one layer may be formed. If the preliminary sheet body 170 has a structure in which the yarn 1211 is wound in two layers, as illustrated in FIG. 8, the emitter 121 in the form of a sheet may be formed in which the plurality of yarns 1211 are arranged in two layers.

For another example, referring to FIG. 10, by compressing the pipe-shaped preliminary sheet body 170 in the side direction, the emitter 121 in the form of a sheet may be formed. Compression includes a method of placing the preliminary sheet body 170 between two plate-shaped members and then pressing the two plate-shaped members and a method of rolling by passing the preliminary sheet body 170 between the two adjacent rollers, but the compression is not limited thereto. When the preliminary sheet body 170 has a structure in which the yarn 1211 is wound into a single layer, as illustrated in FIG. 8, the emitter 121 in the form of a sheet with a two-ply arrangement of the plurality of yarns 1211 may be formed. In a structure in which the preliminary sheet body 170 is wound with two or more layers of yarns 1211, the emitter 121 in the form of a sheet may be formed in which the plurality of yarns 1211 are arranged in an even number of 4 or more layers.

Referring to FIG. 11, the emitter 121 illustrated in FIG. 7 or 8 may be curved to form the ridge **121*a* in the electron emission direction (z), or may be bent to form the ridge 121*a*** in the electron emission direction (z). Here, the emitter 121 may be curved or bent so that the ridge 121*a* is formed parallel to the direction in which the plurality of yarns 1211 extends, that is, in the first direction (x). Here, the first direction (x) may be referred to as machine direction (MD). As such, when the emitter 121 is curved or bent to form the ridge 121*a* in the MD, the ridge 121*a* may be formed according to the texture formed by the plurality of yarns 1211, and thus the emitter 121 in the form of a sheet may be easily curved or bent into various shapes.

In contrast, the emitter 121 may be curved or bent in order for the ridge 121*a* to be formed parallel to the direction intersecting the direction in which the plurality of yarns 1211 extend, that is, in the second direction (y). Here, the second direction (y) may be referred to as cross direction (CD).

As such, when the emitter 121 is curved or bent to form the ridge 121*a* in the CD, the electronic field emission characteristics of the emitter 121 may be improved. Specifically, electrons may be induced to the frontmost point (E) of each yarn 1211 by the electric field and then emitted from the emitter 121. Here, the frontmost point (E) of each yarn 1211 is narrow as illustrated in FIG. 12, and thus electrons induced to the frontmost point (E) by the electric field are crowded by the narrow structure of the frontmost point (E), which may increase the repulsive force between the electrons. Due to this increase in repulsion, electrons may be more easily emitted from the emitter 121. The frontmost point (E) may also be referred to as the electron emission point (E).

Further, when the emitter 121 is curved or bent so that the ridge 121*a* is formed in the CD as illustrated in FIG. 12, the durability of the emitter 121 in the form of a sheet may be improved. Specifically, when the ridge 121*a* is formed parallel to the second direction (y), the ridge 121*a* is not formed along a line where the plurality of yarns 1211 are adjacent to each other, but is formed by each of the plurality of yarns 1211 being curved or bent, and thus the emitter 121 may be prevented from being damaged in the process of curving or bending the emitter 121 that is in the form of a sheet.

Electronic field emission characteristics according to the direction of forming the ridge 121*a* will be described in detail later with reference to FIG. 18.

FIG. 13 illustrates an emitter of a field emission assembly according to another example embodiment. FIG. 14 is an enlarged view of area P of the emitter illustrated in FIG. 13.

The emitter 121 may be formed by weaving the plurality of yarns 1211. Specifically, the emitter 121 may be in the form of a sheet in which a plurality of linearly formed yarns 1211 are woven together. Therefrom, the uniformity of the electrical and mechanical properties of the emitter 121 may be improved, and further, the electrical and mechanical properties may be strengthened.

Specifically, when the plurality of yarns 1211 are woven, the emitter 121 in the form of a sheet may have a certain texture, and therefrom, electron emission points (E) may be uniformly distributed on the sheet and uniformity of electronic field emission characteristics may be improved.

Further, the electron emission point (E) may be formed at the point where the linear yarns 1211 intersect each other. By providing the plurality of yarns 1211 in the form of a regularly woven sheet, elements that overlap the electron emission point (E) in the electron emission direction (z) and interfere with electron emission may be removed. In other words, by the plurality of yarns 1211 being woven regularly, the electron emission point (E), which is the part where the linear yarns 1211 intersect each other, can be exposed forward in the electron emission direction (z). Therefrom, the electron emission may occur more smoothly.

Further, when the plurality of yarns 1211 are woven, structural unity may be ensured among the emitters 121 that are manufactured, and uniformity of the mechanical properties of the emitters 121 may be improved. Therefrom, consistency in the lifespan of the field emission assembly 120 and the apparatus 100 for generating electromagnetic waves may be ensured. Further, when manufacturing the field emission assembly 120, errors due to differences in mechanical properties may be reduced, and thus uniformity of electronic field emission characteristics may also be improved.

Further, when the plurality of yarns 1211 are woven, the structure of the emitter 121 may be strengthened, and thus the durability of the emitter 121, the field emission assembly 120 and the apparatus 100 for generating electromagnetic waves may be improved.

The emitter 121 may be woven in various ways. For example, the emitter 121 may be woven in various ways, such as plain weaving, twill weaving and satin weaving. In other words, the emitter 121 can be formed without being limited to any specific weaving method as long as a regular texture can be formed. The emitter 121 formed by weaving may take the form of a thin and wide sheet, and stiffness may vary slightly depending on the weaving method.

Weaving may indicate that the structure in which the plurality of yarns 1211 are organized can take the form of a sheet without the addition of additional materials or physical or chemical processing. However, if necessary, the sheet structure may be made stronger through the addition of additional materials or through physical or chemical processing.

By the characteristic of weaving formation, the emitter 121 may include a point or an area placed relatively forward and a point or an area placed in the rear, based on the electron emission direction (z). The point or the area placed relatively forward may include a peak, and the point or the area placed relatively in the rear may include a valley. The peaks and valleys may be formed where the yarns 1211 intersect each other. The electron emission point (E) may be formed at the point where the yarns 1211 intersect each other, and the electron emission point (E) may be understood as coinciding with the peak. The areas where peaks and valleys are formed may be thicker than other parts, and thus many electrons may be concentrated. Electron emission may be facilitated through the peak shape. As the plurality of yarns 1211 are woven in a regular texture, a plurality of peaks and valleys have a regular distribution, and therefrom, uniformity of electronic field emission characteristics may be improved.

FIG. 15 shows pictures of yarns constituting the emitter of the field emission assembly according to example embodiments. FIG. 16 illustrates methods of forming an emitter of a field emission assembly according to an example embodiment.

Referring to FIG. 15, the emitter 121 may be composed of a plurality of linear yarns made of carbon nanotube material. Referring to (a) of FIG. 15, each of the plurality of yarns 1211 constituting the emitter 121 may be a twisted yarn. In this case, since the yarn 1211 can be manufactured more easily, manufacturing efficiency may be improved. Further, referring to (b) of FIG. 15, each of the plurality of yarns 1211 constituting the emitter 121 may be a braided yarn. In this case, since the mechanical and electrical properties of the yarns 1211 can be improved, the electronic field emission characteristics can also be improved.

FIG. 16 specifically shows the process of forming the emitter 121 of the field emission assembly 120 according to an example embodiment Referring to (a) and (b) of FIG. 16, the yarns may be twisted yarns. Here, referring to (a) of FIG. 16, the twisted yarn constituting the yarn may be a primary twisted yarn formed by twisting a plurality of carbon nanotube fibers. Further, referring to (b) of FIG. 12, the twisted yarn that makes up the yarn may be a secondary twisted yarn formed by twisting primary twisted yarns together. Here, each primary twisted yarn can be formed by twisting a plurality of carbon nanotube fibers.

Further, referring to (c) and (d) of FIG. 16, the yarn may be a braided yarn. Here, referring to (c) of FIG. 16, the braided yarn that makes up the yarn may be formed by braiding a plurality of primary twisted yarns together. Each of the primary twisted yarns may be formed by twisting a plurality of carbon nanotube fibers. Further, referring to (d) of FIG. 16, the braided yarn that makes up the yarn can be formed by braiding secondary twisted yarns together. Here, the secondary twisted yarn can be formed by twisting a plurality of primary twisted yarns together, and the primary twisted yarn may be formed by twisting a plurality of carbon nanotube fibers.

However, if a sheet-shaped emitter may be formed by weaving, the method of forming the yarn constituting the emitter is not limited to the method previously described with respect to (a) to (d) of FIG. 16. The method for forming the yarn constituting the emitter may be by various combinations of the methods described with respect to (a) to (d) of FIG. 16 depending on the required electronic field emission characteristics, or may be by a method that is not described with respect to (a) to (d) of FIG. 16.

FIG. 17 is a graph illustrating electronic field emission characteristics according to exposed areas of an emitter of a field emission assembly according to an example embodiment.

FIG. 17 illustrates the amount of electron emission in terms of current according to the voltage applied to the electrode when the width (d) of the emitter is 1 mm, 4 mm and 12 mm, when the emitter is folded in the cross direction as illustrated in FIG. 12 and the emitter is fixed to the holder so that the protruding height from the holder is 1 mm. The x-axis of FIG. 17 is voltage and the y-axis is current.

Referring to FIG. 17, even if the voltage is increased, the current is not detected up to a certain voltage, and beyond a certain voltage, the current increases as the voltage increases. Here, when the width (d) of the emitter is 1 mm, the average value of the threshold voltage (hereinafter referred to as "Threshold. V") at the point when the detection current beings to be detected is 1.33 kV, when the width (d) of the emitter is 4 mm, the average value of Threshold. V is 1.10 kV, and when the width (d) of the emitter is 12 mm, the average value of Threshold. V is 0.80 kV.

Further, depending on the width (d) of the emitter, the magnitude of the voltage applied to the electrode when a current of 3 mA is detected (hereinafter referred to as "V@3 mA") is different. When the width (d) of the emitter is 1 mm, V@3 mA is 2.42 kV, when the width (d) of the emitter is 4 mm, V@3 mA is 2.06 kV, and when the width (d) of the emitter is 12 mm, V@3 mA is 1.63 kV.

Further, the slope of the current according to the voltage when the width (d) of the emitter is 4 mm is greater than the slope of the current according to the voltage when the width (d) of the emitter is 1 mm, and the slope of the current according to the voltage when the width (d) of the emitter is 12 mm is greater than the slope of the current according to the voltage when the width (d) of the emitter is 4 mm.

The electronic field emission characteristics according to the exposed area of the emitter illustrated in FIG. 17 are shown in Table 1 below.

TABLE 1

| | | Threshold voltage (Threshold. V) | |
|---|---|---|---|
| Width (d) of the emitter | V@3 mA | Average (Avg) | Population standard deviation (std. p) |
| 1 mm | 2.42 kV | 1.33 kV | 0.05 |
| 4 mm | 2.06 kV | 1.10 kV | 0.00 |
| 12 mm | 1.63 kV | 0.80 kV | 0.00 |

Referring to FIG. 17 and [Table] 1, V@3 mA becomes smaller as the width (d) of the emitter becomes wider. This may indicate that the wider the width (d) of the emitter, the easier it is to reach a specific current. In other words, the wider the emitter width (d), the better the electronic field emission characteristics.

Further, referring to FIG. 17 and [Table 1], Threshold. V becomes smaller as the width (d) of the emitter is wider. This may indicate that as the width (d) of the emitter becomes wider, electrons begin to be emitted even at a lower voltage. In other words, the wider the width (d) of the emitter, the more easily electrons are emitted, improving electronic field emission characteristics.

FIG. 18 is a graph illustrating electronic field emission characteristics according to the direction in which a ridge of an emitter of a field emission assembly is formed according to an example embodiment.

Specifically, FIG. 18 illustrates electronic field emission characteristics when the emitter is folded so that the ridge of the emitter is formed in the machine direction (MD), which is the direction in which the yarns extend, and electronic field emission characteristics when the emitter is folded so that the ridge of the emitter is formed in the cross direction (CD), which is the direction that intersects the direction in which the yarns extend.

Referring to FIG. 18, when the ridge of the emitter is formed in the MD, V@3 mA is 2.01 kV, and when the ridge of the emitter is formed in the CD, V@3 mA is 1.68 kV.

Further, when the ridge of the emitter is formed in the MD, Threshold. V is 1.10 kV, and when the ridge of the emitter is formed in the CD, Threshold. V is 0.90 kV.

The electronic field emission characteristics according to the direction in which the ridge of the emitter is formed illustrated in FIG. 18 are shown in [Table 2] below.

TABLE 2

| | | Threshold voltage (Threshold. V) | |
|---|---|---|---|
| Direction in which the ridge is formed | V@3 mA | Average (Avg) | Population standard deviation (std. p) |
| Machine direction (MD) | 2.01 kV | 1.10 kV | 0.05 |
| Cross direction (CD) | 1.68 kV | 0.90 kV | 0.00 |

Referring to FIG. 18 and [Table 2], the V@3 mA value when the ridge of the emitter is formed in the CD is smaller than the V@3 mA value when the ridge of the emitter is formed in the MD. This may indicate that it is easier to reach a specific current when the ridge of the emitter is formed in the CD compared to when the ridge of the emitter is formed in the MD.

Further, referring to FIG. 18 and [Table 2], the Threshold. V value when the ridge of the emitter is formed in the CD is smaller than the Threshold. V value when the ridge of the emitter is formed in the MD. This may indicate that when the ridge of the emitter is formed in the CD, electrons begin to be emitted even at a lower voltage compared to when the ridge of the emitter is formed in the MD.

Through the data, it may be identified that the emitter in the form of a sheet has better electronic field emission characteristics when the ridge is formed in the CD than when the ridge is formed in the MD. The reason why electronic field emission characteristics are improved when the ridge of the emitter is formed in the CD is as described above with reference to FIG. 12.

FIG. 19 is a perspective view illustrating a field emission assembly according to an example embodiment. FIG. 20 is a perspective view illustrating a field emission assembly according to another example embodiment.

The detailed elements of a field emission assembly 220 according to another example embodiment that is not described below may be the same as the detailed elements of the field emission assembly 120 according to the example embodiments described in relation to FIGS. 1 to 18.

Referring to FIGS. 19 and 20, both ends of an emitter 221 may be adjacent to each other centered a ridge 221*a* and may be fixed to a holder 222. In other words, both ends of the emitter 221 may be fixed to the holder 222 in close contact with each other.

The holder 222 may include a first body part 2221. Both ends of the emitter 221 may be in close contact with one side surface of the first body part 2221. As illustrated in FIGS. 19 and 20, the first body part 2221 may be provided in a box shape, but as long as both ends of the emitter 221 can be brought into close contact with one side surface of the first body part 2221, the first body part 2221 is not limited to a specific shape.

Referring to FIG. 19, the holder 222 may include a second body part 2222. The second body part 2222 may be disposed on one side of the first body part 2221. The second body part 2222 may be adjacent to or closely coupled to one side surface of the first body part 2221. Both ends of the emitter 221 may be disposed between the first body part 2221 and the second body part 2222.

The emitter 221 may be fixed to the holder 222 in various ways. For example, both ends of the emitter 221 may directly pressed and fixed by the first body part 2221 and the second body part 2222. For example, when a coupling member (not illustrated) is provided that passes through the first body part 2221 and the second body part 2222, as the coupling member is tightened, the gap between the first body part 2221 and the second body part 2222 narrows and the emitter 221 is compressed. For another example, both ends of the emitter 221 may be fixed to the holder 222 by the ends being pressurized by one end of the coupling member penetrating either the first body part 2221 or the second body part 2222 and a side of the remaining one between the first body part 2221 and the second body part 2222.

The first body part 2221 and the second body part 2222 may each be provided as separate members. In this case, the first body part 2221 and the second body part 2222 may each be manufactured in a box shape, and thus it may be easy to manufacture each member. On the other hand, the first body part 2221 and the second body part 2222 may be formed integrally. Even if the first body part 2221 and the second body part 2222 are formed as one body, there may be still a gap between the first body part 2221 and the second body part 2222 where the emitter 221 can be seated. In this case, the process of aligning the first body part 2221 and the second body part 2222 with each other may not be necessary, and thus the process of fixing the emitter 221 to the holder 222 may be facilitated.

Referring to FIG. 20, unlike what is described above with reference to FIG. 19, the holder 222 may not be provided with the second body part 2222.

Specifically, both ends of the emitter 221 may be attached to one side surface of the first body part 2221. For example, both ends of the emitter 221 may be welded to one side surface of the first body part 2221 using a welding material 2224. For another example, both ends of the emitter 221 may be attached to one side surface of the first body part 2221 with the adhesive 2224.

Further, unlike what is described with respect to FIGS. 19 and 20, the second body part 2222 may not be included in the holder 222, and the coupling member may be directly coupled to the side of the first body part 2221. In this case, with both ends of the emitter 221 in close contact with one side surface of the first body part 2221, by passing a coupling member through both ends of the emitter 221 and coupling the coupling member to one side surface of the first body part 2221, the emitter 221 may be fixed to the holder 222.

Any example embodiment described in the present disclosure or other example embodiments are not mutually exclusive or distinct. In the above described example embodiments of the present disclosure, or in other example embodiments, each of components or functions may be used together or combined.

For example, component A described in a specific example embodiment and/or drawings may be combined with component B in another example embodiment and/or drawings. In other words, even if a combination between the components is not directly descried, the combination may be possible except for the case where it is explained that the combination is impossible.

The above detailed description should not be construed as restrictive in all respect and should be considered as illustrative. The scope of the present disclosure should be determined by a reasonable interpretation of the appended claims, and all modifications within the equivalent scope of the present disclosure are included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An emitter that emits electrons in an apparatus for generating electromagnetic waves, wherein the emitter is in a form of a sheet in which a plurality of yarns including carbon nanotube fibers are woven, wherein the plurality of yarns are woven together to form the sheet, the emitter comprising at least one of a curved part to form a ridge in a direction of electron emission and a part bent to form a ridge in the direction of electron emission.

2. The emitter of claim 1, wherein the curved part or the part bent forms a single ridge.

3. The emitter of claim 2, wherein, each of both side portions of the ridge becomes closer to each other towards direction of electron emission.

4. The emitter of claim 1, wherein the emitter has a shape in which a slope of a tangent changes continuously.

5. The emitter of claim 4, first curvature at the ridge is different from a second curvature of other parts of the emitter.

6. The emitter of claim 1, wherein, the part bent includes a concave shape dented toward a center, and the concave shape is formed in each of both side portions of the ridge.

7. The emitter of claim 1, wherein the plurality of yarns extending in a first direction is arranged in a second direction that intersects the first direction.

8. The emitter of claim 7, wherein the ridge is formed parallel to the first direction.

9. The emitter of claim 7, wherein the ridge is formed parallel to the second direction.

10. A field emission assembly, comprising:

an emitter that is in a form of a sheet in which a plurality of yarns including carbon nanotube fibers are woven, wherein the plurality of yarns are woven together to form the sheet; and a holder that fixes the emitter, wherein the emitter in the form of the sheet includes at least one of a curved part to form a ridge in a direction of electron emission and a part bent to form a ridge in the direction of electron emission.

11. The field emission assembly of claim 10, wherein the emitter is electrically connected to the holder by at least one of a manner that the emitter is pressed by the holder, a manner that the emitter is welded to the holder, and a manner that the emitter is attached to the holder by adhesive.

12. The field emission assembly of claim 10, wherein the emitter has two ends that are spaced apart from each other centered on the ridge and fixed to the holder.

13. The field emission assembly of claim 12, wherein the holder includes a body part, and wherein the two ends of the emitter are in close contact with both sides of the body part, respectively.

14. The field emission assembly of claim 13, wherein the holder includes a first fixing part disposed on one side of the body part and a second fixing part disposed on an opposite side of the body part, and wherein an end of the emitter is disposed between the body part and the first fixing part, and an opposite end of the emitter is disposed between the body part and the second fixing part.

15. The field emission assembly of claim 12, wherein the two ends of the emitter, centered on the ridge, are adjacent to each other and are fixed to the holder.

16. The field emission assembly of claim 15, wherein the holder includes a first body part, and wherein one of the two ends of the emitter are is in close contact with one side surface of the first body part.

17. The field emission assembly of claim 16, wherein the holder includes a second body part disposed on one side of the first body part, and wherein the two ends of the emitter are disposed between the first body part and the second body part.

18. The field emission assembly of claim 10, wherein the emitter has a length in a direction of the ridge and the length is greater than a height to which the emitter protrudes from the holder.

* * * * *